US012693622B2

(12) United States Patent

Gamo et al.

(10) Patent No.: US 12,693,622 B2
(45) Date of Patent: Jul. 28, 2026

(54) DEVELOPER SUPPLY CONTAINER AND DEVELOPER SUPPLYING SYSTEM

(71) Applicant: CANON KABUSHIKI KAISHA, Tokyo (JP)

(72) Inventors: Yohei Gamo, Abiko (JP); Daijiro Kato, Abiko (JP); Yusuke Oizumi, Toride (JP); Ayatomo Okino, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/983,732

(22) Filed: Dec. 17, 2024

(65) Prior Publication Data

US 2025/0116959 A1 Apr. 10, 2025

Related U.S. Application Data

(60) Division of application No. 18/241,375, filed on Sep. 1, 2023, now Pat. No. 12,204,272, which is a division (Continued)

(30) Foreign Application Priority Data

Sep. 21, 2017 (JP) ................................ 2017-181798

(51) Int. Cl.
*G03G 21/16* (2006.01)
*G03G 15/08* (2006.01)

(52) U.S. Cl.
CPC ..... *G03G 21/1647* (2013.01); *G03G 15/0867* (2013.01); *G03G 15/087* (2013.01);
(Continued)

(58) Field of Classification Search
CPC .. G03G 15/08; G03G 15/0867; G03G 15/087; G03G 15/0872; G03G 15/0877;
(Continued)

(56) References Cited

U.S. PATENT DOCUMENTS

| | | | |
|---|---|---|---|
| 7,050,728 B2 | 5/2006 | Minagawa et al. | |
| 8,000,614 B2 | 8/2011 | Okino et al. | |

(Continued)

FOREIGN PATENT DOCUMENTS

| | | |
|---|---|---|
| CN | 104460266 A | 3/2015 |
| CN | 105103056 A | 11/2015 |

(Continued)

OTHER PUBLICATIONS

International Search Report and Written Opinion for International Patent Application No. PCT/JP2018/036622, mailed Dec. 18, 2018.

(Continued)

*Primary Examiner* — Sophia S Chen
(74) *Attorney, Agent, or Firm* — Venable LLP

(57) ABSTRACT

A developer supply container is detachably mountable to a developer receiving apparatus, the developer receiving apparatus including a developer receiving portion provided with a receiving port for receiving a developer and including a portion-to-be-engaged of displacing integrally with the developer receiving portion. The developer supply container includes a discharging portion provided with a shutter opening for discharging the developer accommodated in the developer accommodating portion, and an engaging portion. The engaging portion engages with the portion-to-be-engaged with a mounting operation of the developer supply container to displace the developer receiving portion so as to bring the receiving opening into fluid communication with the shutter opening. The engaging portion includes a curved portion having an angle relative to a mounting direction of the developer supply container, the angle decreasing with approach toward an upstream side in the mounting direction.

4 Claims, 20 Drawing Sheets

Related U.S. Application Data of application No. 17/950,379, filed on Sep. 22, 2022, now Pat. No. 11,782,382, which is a division of application No. 17/388,168, filed on Jul. 29, 2021, now Pat. No. 11,487,239, which is a division of application No. 16/790,957, filed on Feb. 14, 2020, now Pat. No. 11,156,952, which is a division of application No. 16/353,215, filed on Mar. 14, 2019, now Pat. No. 10,591,865, which is a continuation of application No. PCT/JP2018/036622, filed on Sep. 21, 2018.

(52) U.S. Cl.
CPC ..... *G03G 15/0877* (2013.01); *G03G 15/0886* (2013.01); *G03G 21/1676* (2013.01)

(58) Field of Classification Search
CPC ........... G03G 15/0886; G03G 21/1617; G03G 21/1676; G03G 2215/0668; G03G 2221/1654
See application file for complete search history.

(56) References Cited

U.S. PATENT DOCUMENTS

| | | | |
|---|---|---|---|
| 8,145,092 | B2 | 3/2012 | Huang |
| 9,348,261 | B2 | 5/2016 | Enokuchi et al. |
| 9,354,549 | B1 | 5/2016 | Okino et al. |
| 9,529,299 | B2 | 12/2016 | Okino et al. |
| 9,535,369 | B2 | 1/2017 | Kamura et al. |
| 9,588,461 | B2 | 3/2017 | Kamura et al. |
| 9,811,024 | B2 | 11/2017 | Yomoda et al. |
| 10,088,775 | B2 | 10/2018 | Kamura et al. |
| 10,591,865 | B2 | 3/2020 | Gamo et al. |
| 2003/0219262 | A1 | 11/2003 | Doi |
| 2012/0134717 | A1 | 5/2012 | Nagashima et al. |
| 2013/0078004 | A1 | 3/2013 | Matsumoto |
| 2014/0140737 | A1 | 5/2014 | Yamanaka |
| 2014/0153974 | A1 | 6/2014 | Jimba et al. |
| 2014/0270859 | A1 | 9/2014 | Hosokawa et al. |
| 2015/0043944 | A1 | 2/2015 | Yamamoto |
| 2015/0248102 | A1 | 9/2015 | Nakajima |
| 2016/0004186 | A1 | 1/2016 | Jimba et al. |
| 2016/0153974 | A1 | 6/2016 | Donolato et al. |
| 2016/0154375 | A1 | 6/2016 | Kamizato et al. |
| 2016/0223981 | A1 | 8/2016 | Enokuchi et al. |
| 2017/0060029 | A1 | 3/2017 | Yomoda |
| 2017/0242367 | A1 | 8/2017 | Jimba et al. |
| 2017/0351212 | A1 | 12/2017 | Enokuchi et al. |
| 2018/0024465 | A1 | 1/2018 | Yomoda et al. |
| 2018/0143566 | A1 | 5/2018 | Kawasumi |
| 2019/0212672 | A1 | 7/2019 | Gamo et al. |
| 2019/0212674 | A1 | 7/2019 | Murakami et al. |
| 2019/0212693 | A1 | 7/2019 | Okino et al. |
| 2019/0212695 | A1 | 7/2019 | Makino et al. |

FOREIGN PATENT DOCUMENTS

| | | | |
|---|---|---|---|
| CN | 106019867 | A | 10/2016 |
| CN | 206020925 | U | 3/2017 |
| EP | 2 720 088 | A1 | 4/2014 |
| EP | 1 859 323 | B1 | 5/2014 |
| EP | 2 735 914 | A2 | 5/2014 |
| EP | 2 837 973 | A1 | 2/2015 |
| EP | 2 924 511 | A | 9/2015 |
| JP | 2005-107141 | A | 4/2005 |
| JP | 2005-115280 | A | 4/2005 |
| JP | 2006-047354 | A | 2/2006 |
| JP | 2017-304226 | A | 11/2007 |
| JP | 2012-200625 | A | 11/2012 |
| JP | 2013-068823 | A | 4/2013 |
| JP | 2013-015826 | A | 1/2014 |
| JP | 2014-122091 | A | 7/2014 |
| JP | 2014-182267 | A | 9/2014 |
| JP | 2015-036704 | A | 2/2015 |
| JP | 2016-102987 | A | 6/2016 |
| JP | 2017-049273 | A | 3/2017 |
| JP | 2017-068285 | A | 4/2017 |
| KR | 10-2014-0041599 | A | 4/2014 |
| KR | 101679162 | B1 | 12/2016 |
| RU | 2 628 667 | C2 | 8/2017 |

OTHER PUBLICATIONS

Jul. 30, 2020 Examination Report in Australian Patent Application No. 2018335182.
Oct. 28, 2020 Office Action in Russian Patent Application No. 2020113996 (with English translation).
Mar. 10, 2021 Decision to Grant in Russian Patent Application No. 2020113966 (with English translation).
Jun. 18, 2021 Examination Report in Indian Patent Application No. 202047015921.
May 25, 2021 Office Action in Japanese Patent Application No. 2017-181798.
May 31, 2021 Office Action in Canadian Patent Application No. 3,076,608.
Nov. 25, 2020 Office Action in Eurasian Patent Application No. 202090797 (with English translation).
Feb. 1, 2021 Office Action in Korean Patent Application No. 10-2020-7011446.
Jul. 29, 2021 Extended Search Report in European Patent Application No. 18857632.6.
Aug. 9, 2021 Office Action in German Patent Patent Application No. 11 2018 004 237.5 (with English translation).
Sep. 13, 2021 Office Action in Korean Patent Application No. 10-2021-7024456 (with English translation).
Apr. 1, 2022 Notice of Allowance in Korean Patent Application No. 10-2021-7024456.
Aug. 16, 2022 Notice of Allowance in Korean Patent Application No. 10-1022-7022597.
Dec. 7, 2021 Decision to Grant in Russian Patent Application No. 2021113842 (with English translation).
Dec. 27, 2021 Office Action in Chinese Patent Application No. 201880060176.2 (with English translation).
Sep. 15, 2002 Examination Report in Australian Patent Application No. 2021209326.
Jan. 9, 2023 Office Action in Korean Patent Application No. 10-2022-7040311.
Mar. 8, 2023 Examination Report in Malaysian Patent Application No. PI2020001414.
Apr. 16, 2024 Extended Search Report in European Patent Application No. 23 209 004.3.
May 15, 2024 Extended Search Report in European Patent Application No. 23 201 832.5.
May 11, 2024 Office Action in Chinese Patent Application Pub. No. 202211282643.0 (with English translation).
Jul. 6, 2024 Examination Report in Australian Patent Application Pub. No. 2023229581.
Oct. 7, 2024 Office Action in Korean Patent Application No. 10-2024-7028188 (with English translation).
Jul. 14, 2025 Office Action in Brazilian Patent Application No. 112020004079-7 (with English translation).
Jun. 17, 2025 Notice of Acceptance in Australian Patent Application No. 2023229581.
Sep. 25, 2025 Notice of Allowance in Korean Patent Application No. 10-2024-7028188.
Jan. 7, 2026 Office Action in Brazilian Patent Application No. 112020004079-7 (with English translation).
Feb. 25, 2026 Communication in European Patent Application No. 23 209 004.3.
Mar. 9, 2026 Communication in European Patent Application No. 23 201 832.5.

(a)

(b)

(a)

(b)

(a)

(b)

DEVELOPER SUPPLY CONTAINER AND DEVELOPER SUPPLYING SYSTEM

TECHNICAL FIELD

The present invention relates to a developer supply container dismountably mountable to a developer receiving apparatus and a developer supplying system.

BACKGROUND ART

Conventionally, in electrophotographic image forming apparatuses such as copying machines, fine developing powder such as toner has been used. In such an image forming apparatus, the developer consumed by the image formation is supplemented from a developer supply container.

For example, a structure has been proposed in which the developer supply container is mountable to and dismountable from a developer receiving apparatus provided in the image forming apparatus, and the developer receiving portion of the developer receiving apparatus is displaced toward the discharge opening of the developer supply container in accordance with the mounting operation of the developer supply container (JP2013-015826A).

SUMMARY OF THE INVENTION

Problems to be Solved by Invention

It is an object of the present invention to provide a structure capable of reducing the operating force for mounting a developer supply container.

Means for Solving the Problem

According to an aspect of the present invention, there is provided a developer supply container detachably mountable to a developer receiving apparatus, said developer receiving apparatus including a developer receiving portion provided with a receiving port for receiving a developer and including a portion-to-be-engaged capable of displacing integrally with said developer receiving portion, said developer supply container comprising a rotatable developer accommodating portion for accommodating the developer; a discharging portion provided at a bottom side thereof with a discharge opening for discharging the developer accommodating in said developer accommodating portion; and an engaging portion engageable with the portion-to-be-engaged with a mounting operation of said developer supply container to displace said developer receiving portion in a displacing direction so as to bring the receiving opening into fluid communication with said discharge opening, wherein said engaging portion has such a shape that a first angle relative to a mounting direction of said developer supply container at a downstream end portion in the mounting direction is larger than a second angle relative to the mounting direction at an upstream end portion in the mounting direction.

Effect of the Invention

According to the present invention, it is possible to reduce the operating force for mounting the developer supply container.

BRIEF DESCRIPTION OF THE INVENTION

Figure 3:
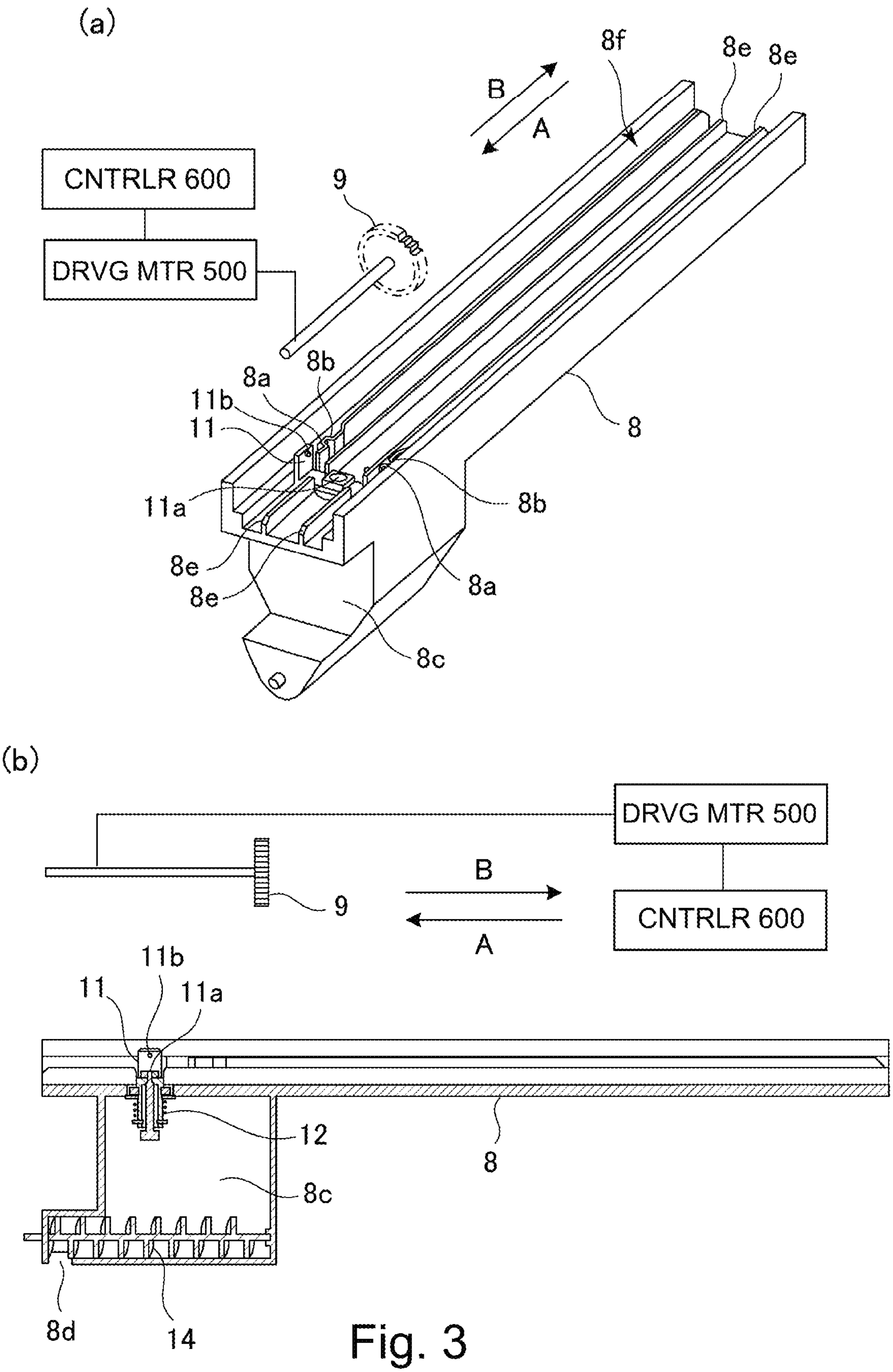

Parts (a) and (b) of FIG. 3 show a developer receiving apparatus according to Embodiment 1, in which part (a) is a perspective view thereof, and part (b) is a cross-sectional view thereof.

Figure 4:
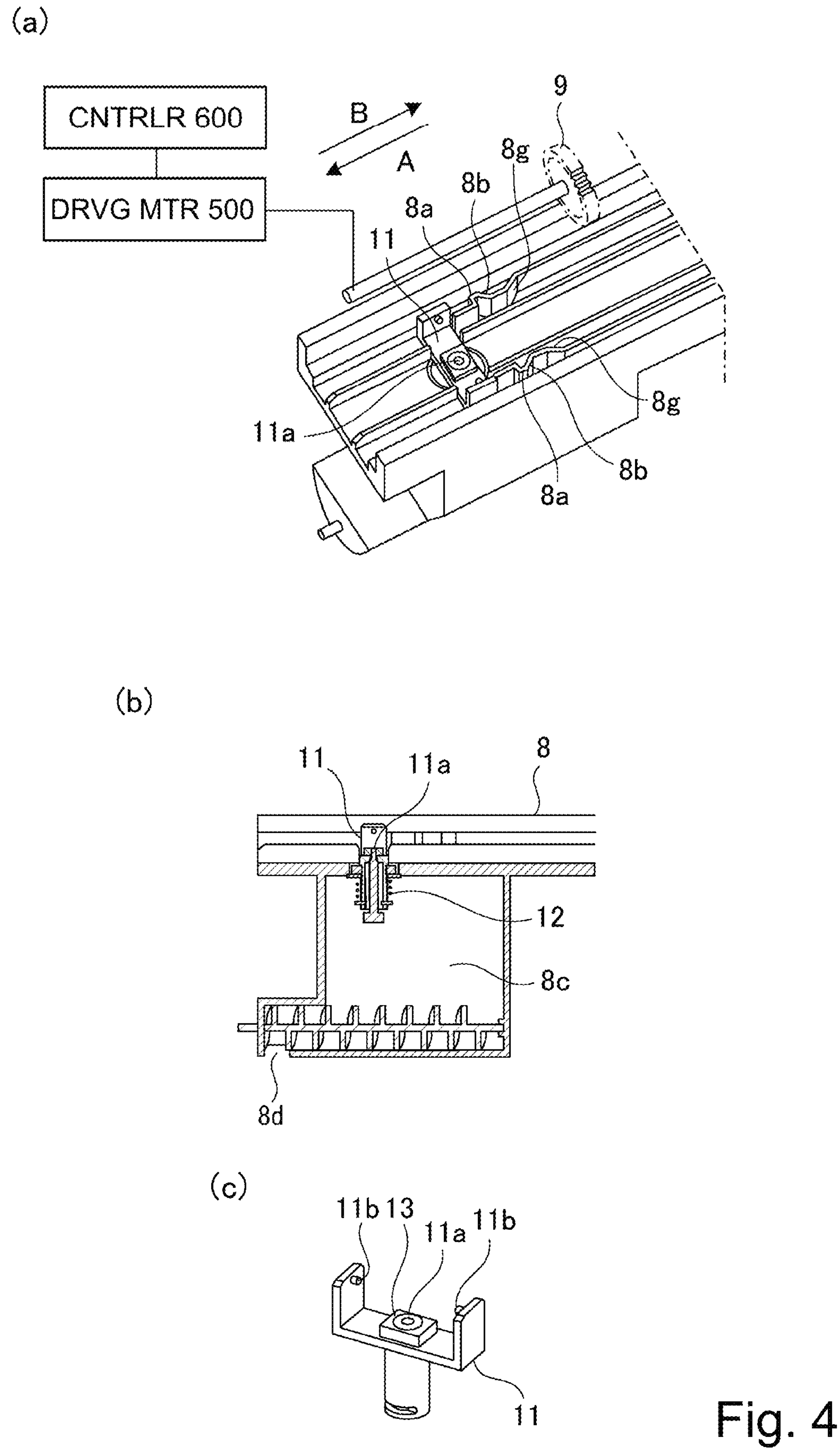

Parts (a), (b) and (c) of FIG. 4 show a developer receiving apparatus according to Embodiment 1, in which part (a) is an enlarged partial perspective view thereof, part (b) is an enlarged cross sectional view thereof, and part (c) is a perspective view of a developer receiving portion.

Figure 5:
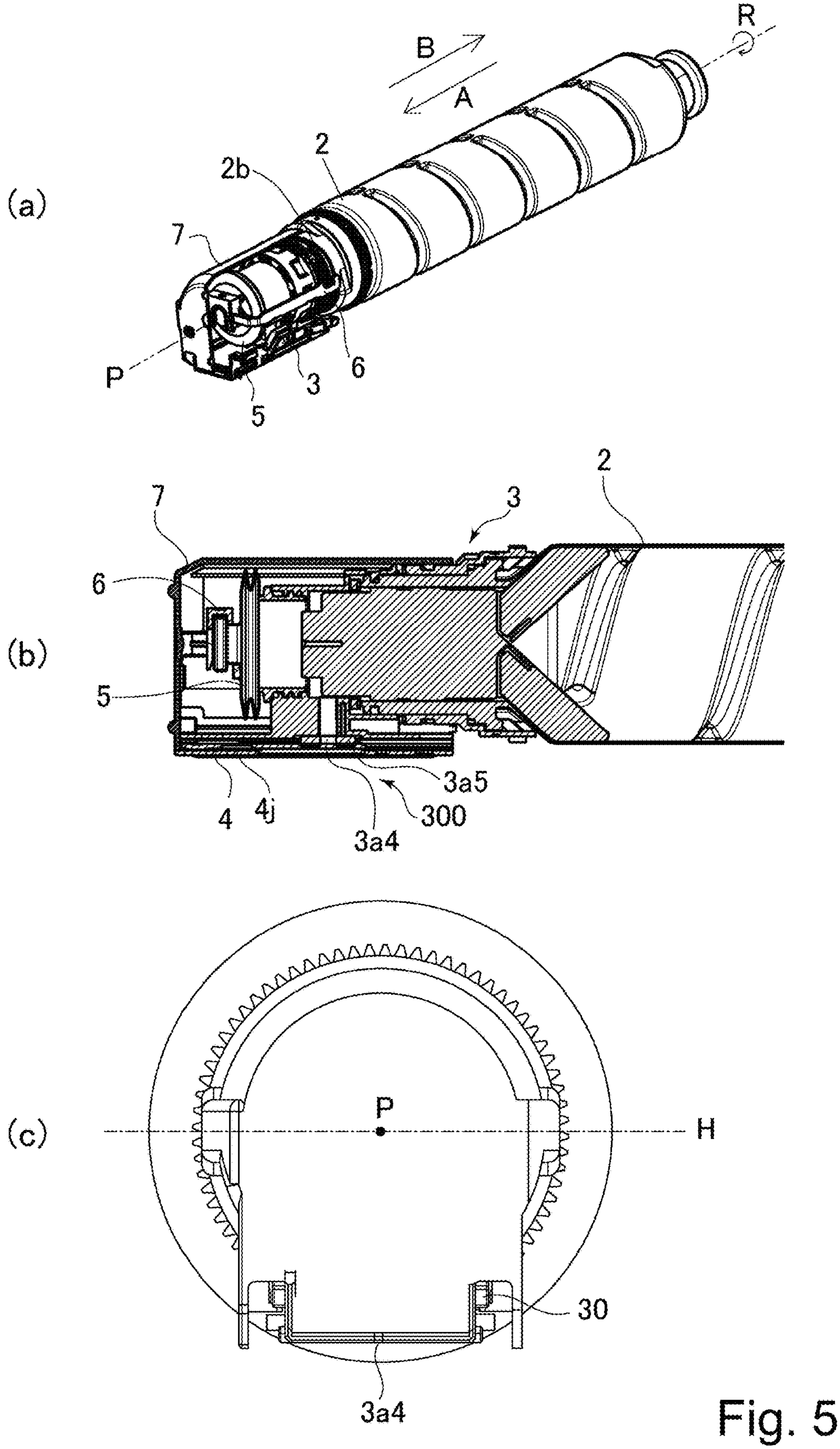

Parts (a), (b) and (c) of FIG. 5 show a developer supply container according to Embodiment 1, in which part (a) is a partially cut-away perspective view, part (b) is a cross-sectional view thereof around a flange portion, and (c) is a front elevational view thereof as viewed from a front side.

Figure 6:
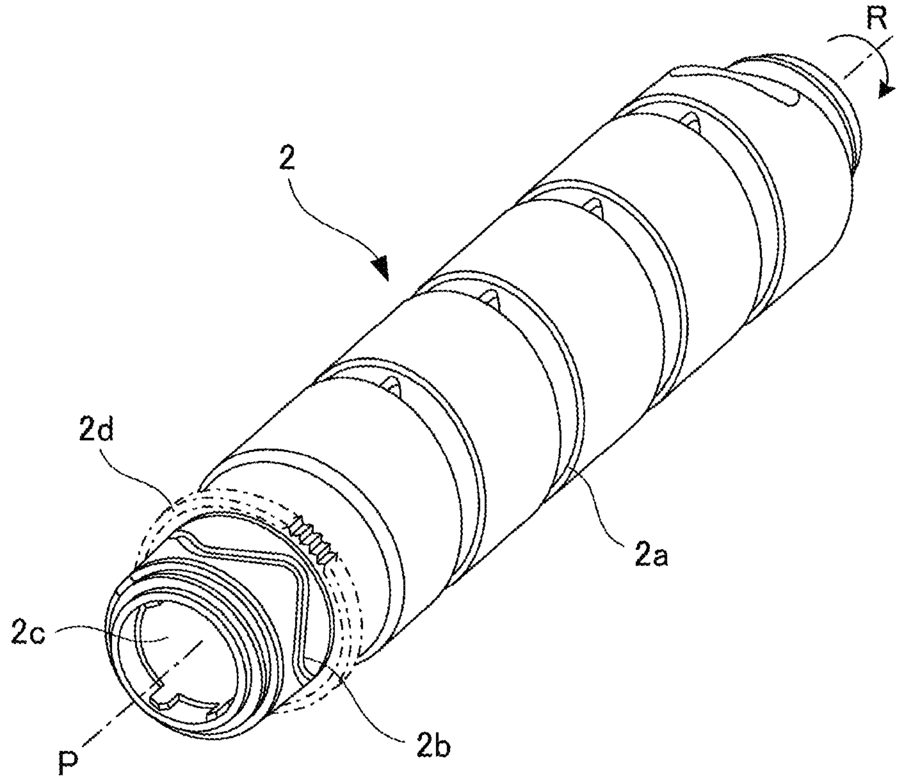

FIG. 6 is a perspective view of the container main body of the developer supply container according to Embodiment 1.

Figure 7:
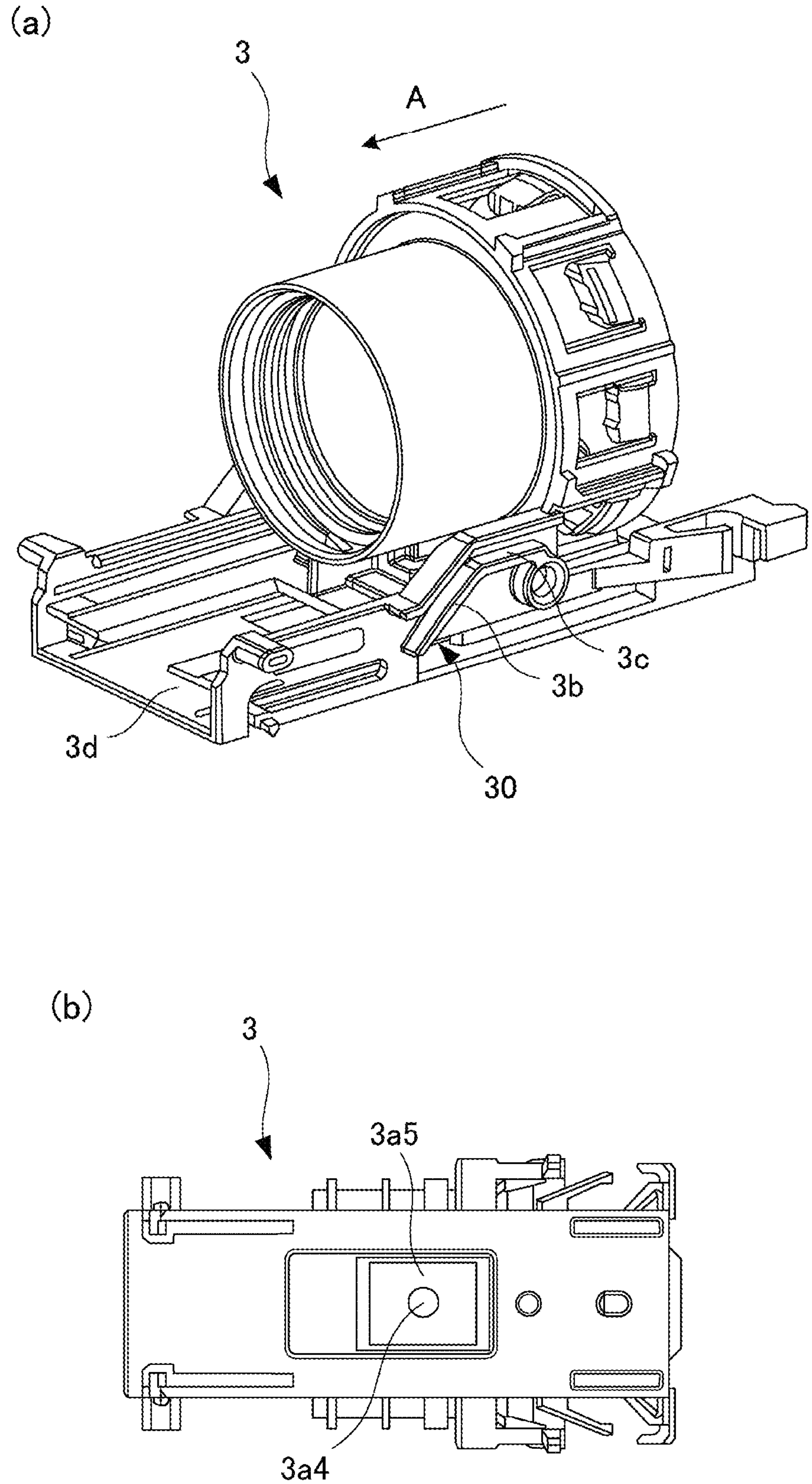

Parts (a) and (b) of FIG. 7 show a flange portion in Embodiment 1, in which part (a) is a perspective view thereof, and (b) is a bottom view thereof.

Figure 8:
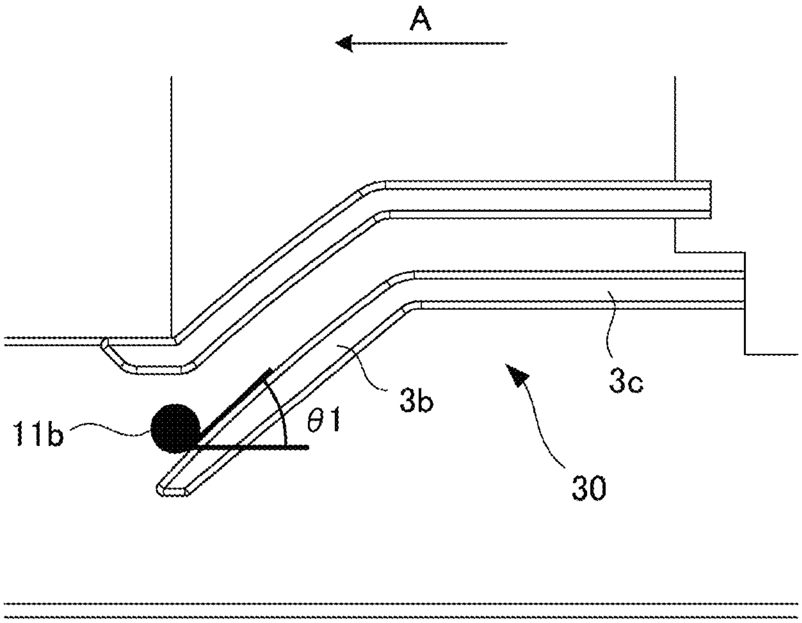
Figure 8:
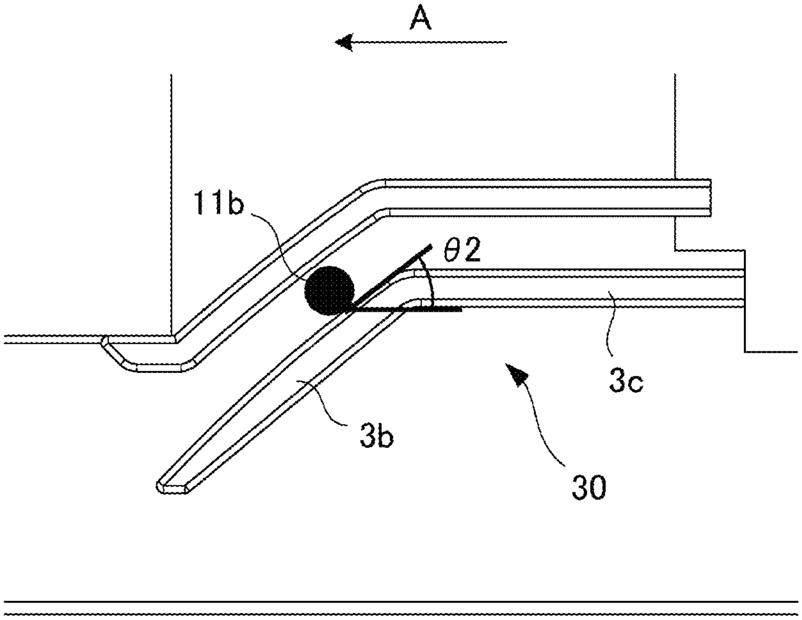

Parts (a) and (b) of FIG. 8 are side views of the engaging portion according to Embodiment 1, in which part (a) shows the contact angle on the downstream side in the mounting direction, and part (b) shows the contact angle on the upstream side in the mounting direction.

Figure 9:
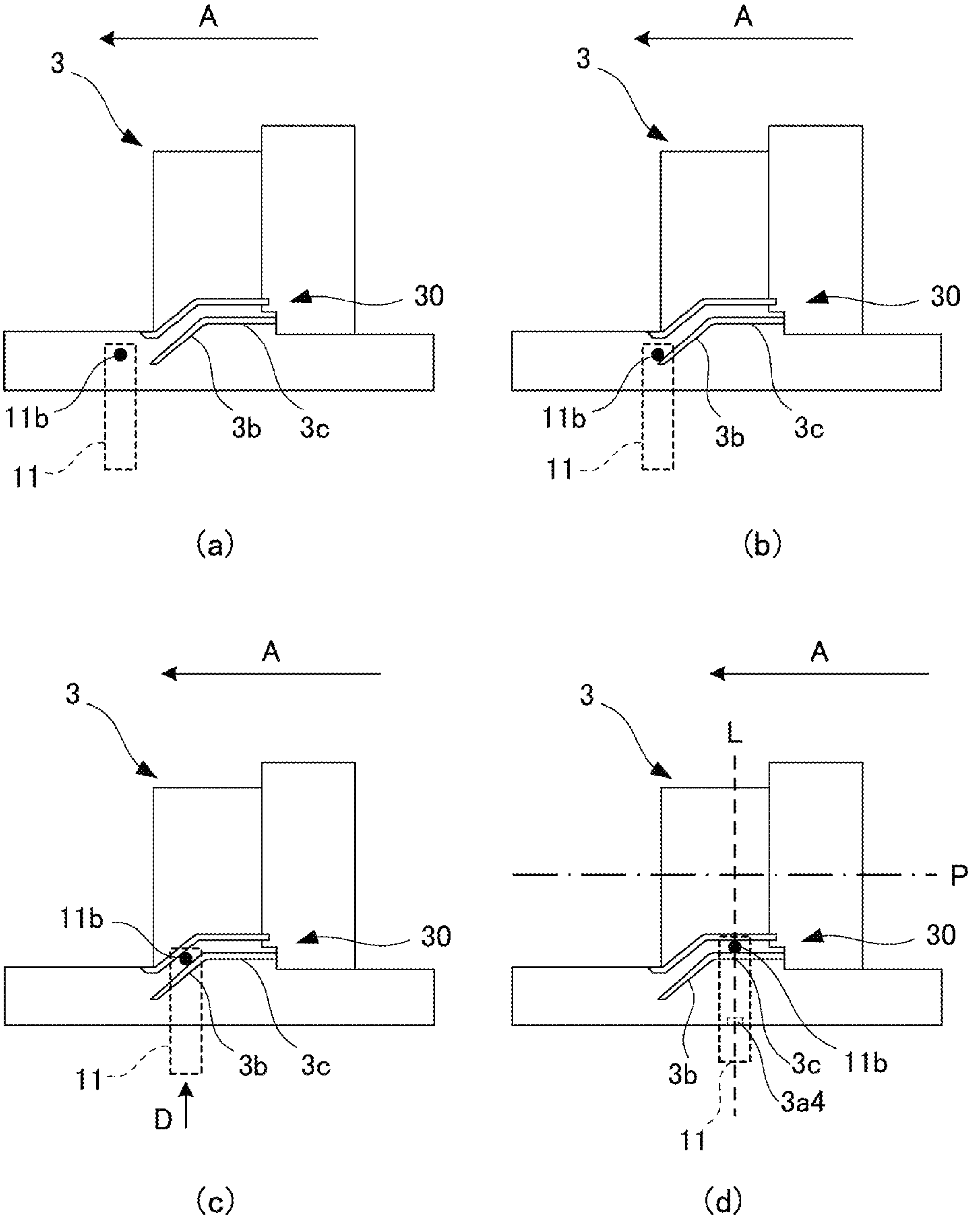

Parts (a), (b), (c) and (d) of FIG. 9 illustrate the relationship between the engaged portion (portion to be engaged) and the engaging portion according to Embodiment 1, in which part (a) shows the relationship before the start of engagement, part (b) shows the relationship at the start of engagement, part (c) shows the relationship during engagement, part (d) shows the relationship when a receiving opening is in communication with the opening.

Figure 10:
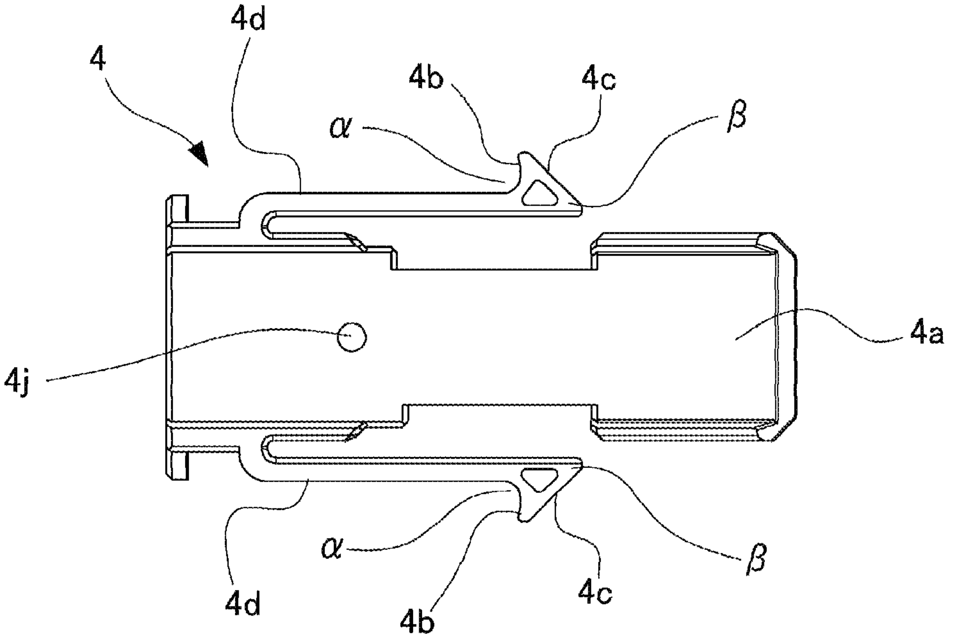
Figure 10:
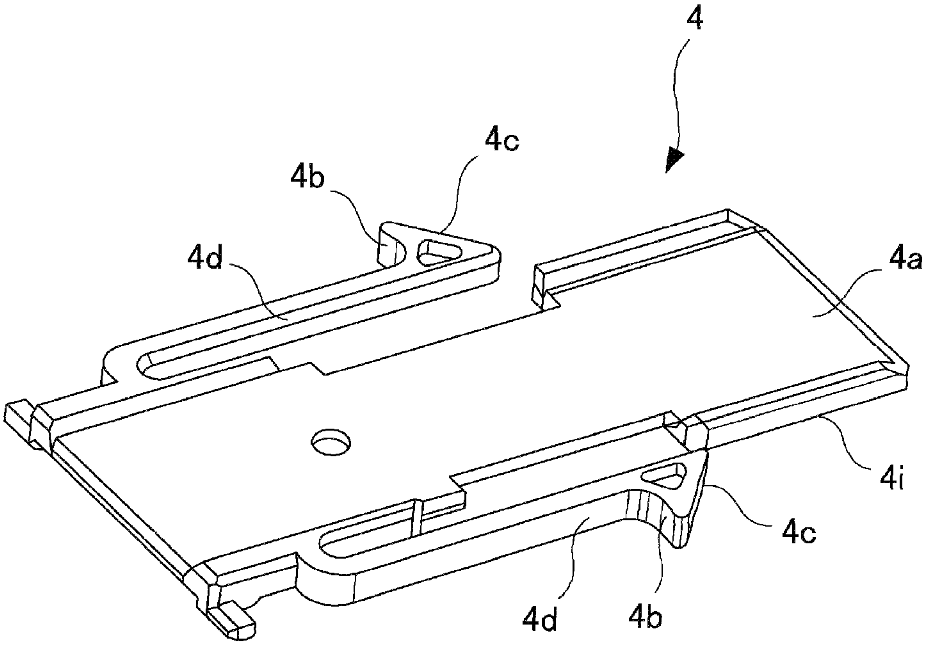

Parts (a) and (b) of FIG. 10 show the shutter according to Embodiment 1, in which part (a) is a top view, and part (b) is a perspective view.

Figure 11:
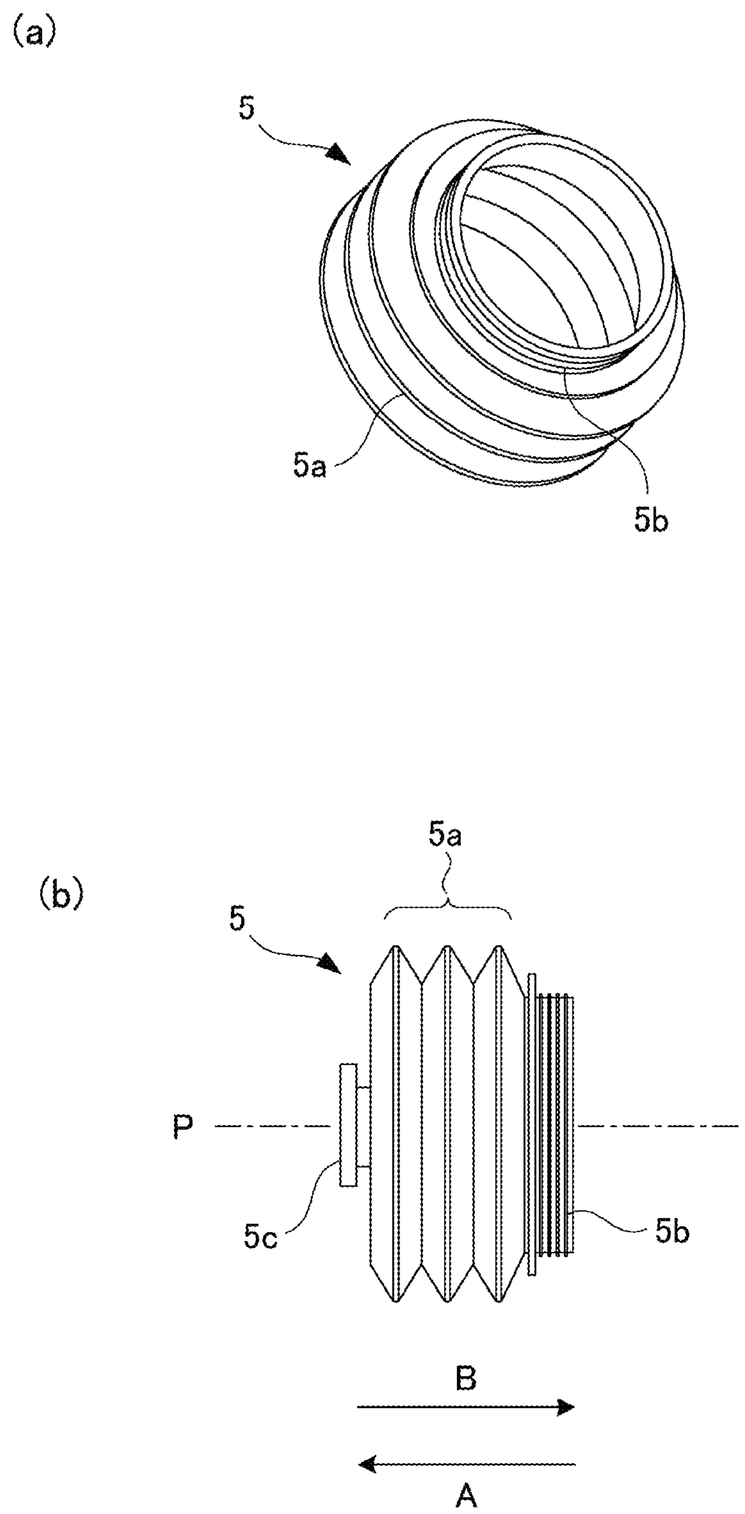

Parts (a) and (b) of FIG. 11 show the pump according to Embodiment 1, in which part (a) is a perspective view, and part (b) is a side view.

Figure 12:
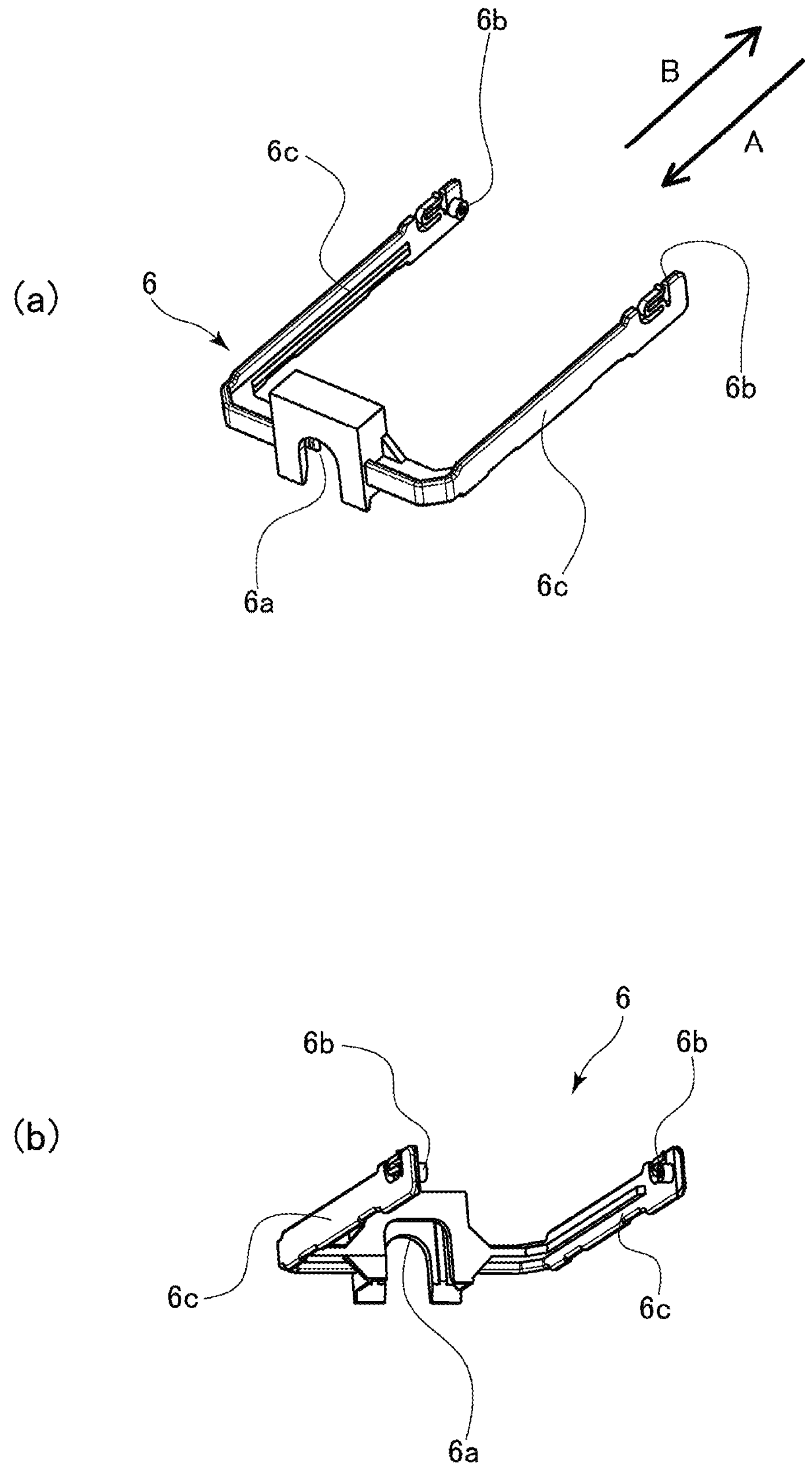

Parts (a) and (b) of FIG. 12 show the reciprocating member according to Embodiment 1, in which part (a) is a perspective view, part (b) is a perspective view as viewed from the opposite side of part (a).

Figure 13:
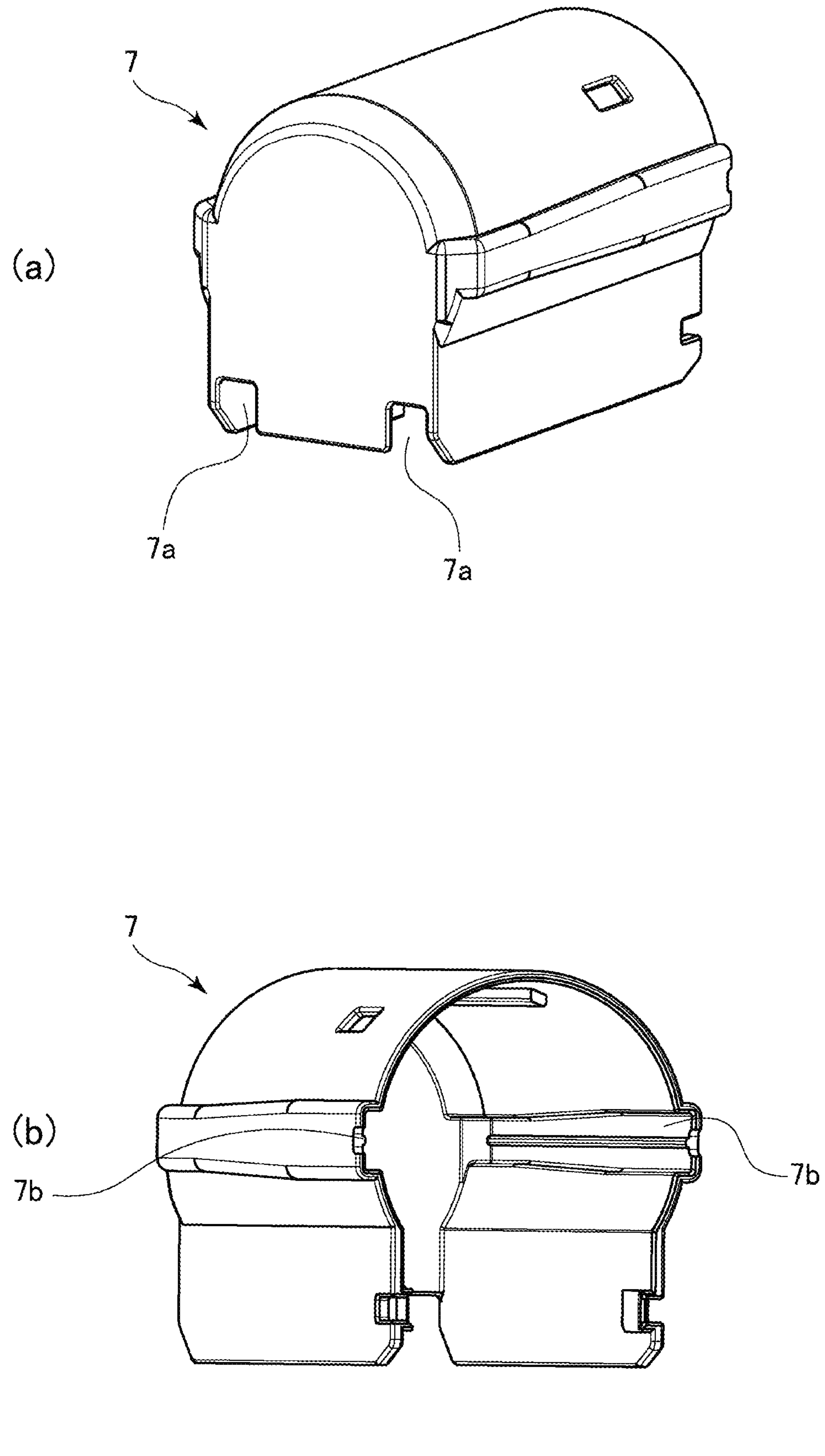

Parts (a) and (b) of FIG. 13 show the cover according to Embodiment 1, in which part (a) is a perspective view, part (b) is a perspective view as viewed from the opposite side of (a).

Figure 14:
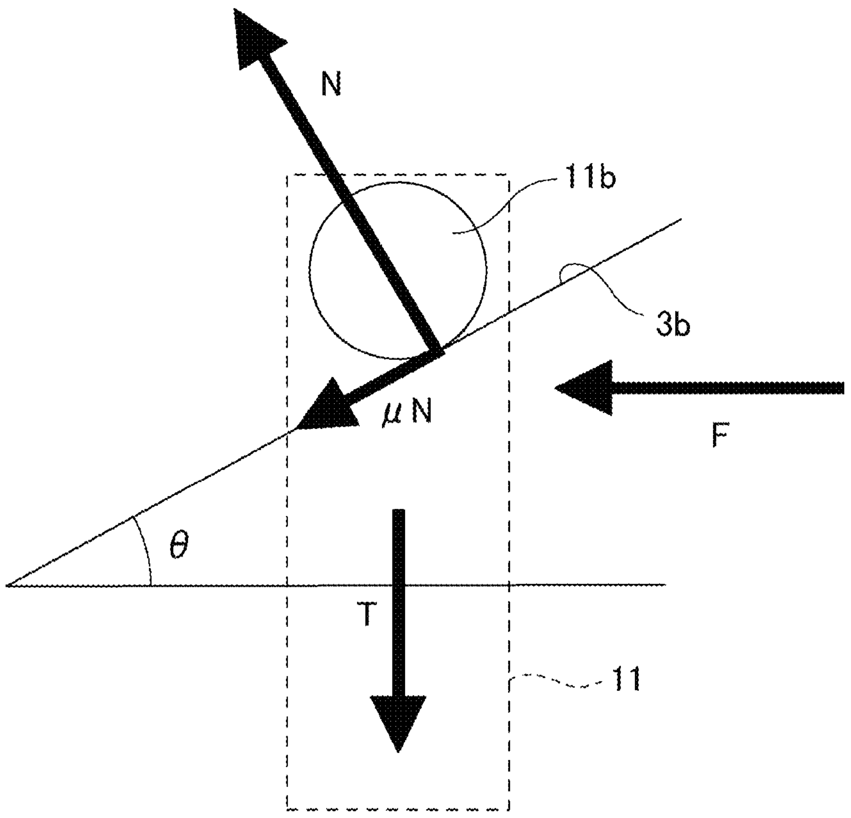

FIG. 14 is a schematic illustration of the force acting on the developer receiving portion during a mounting operation of the developer supply container.

Figure 15:
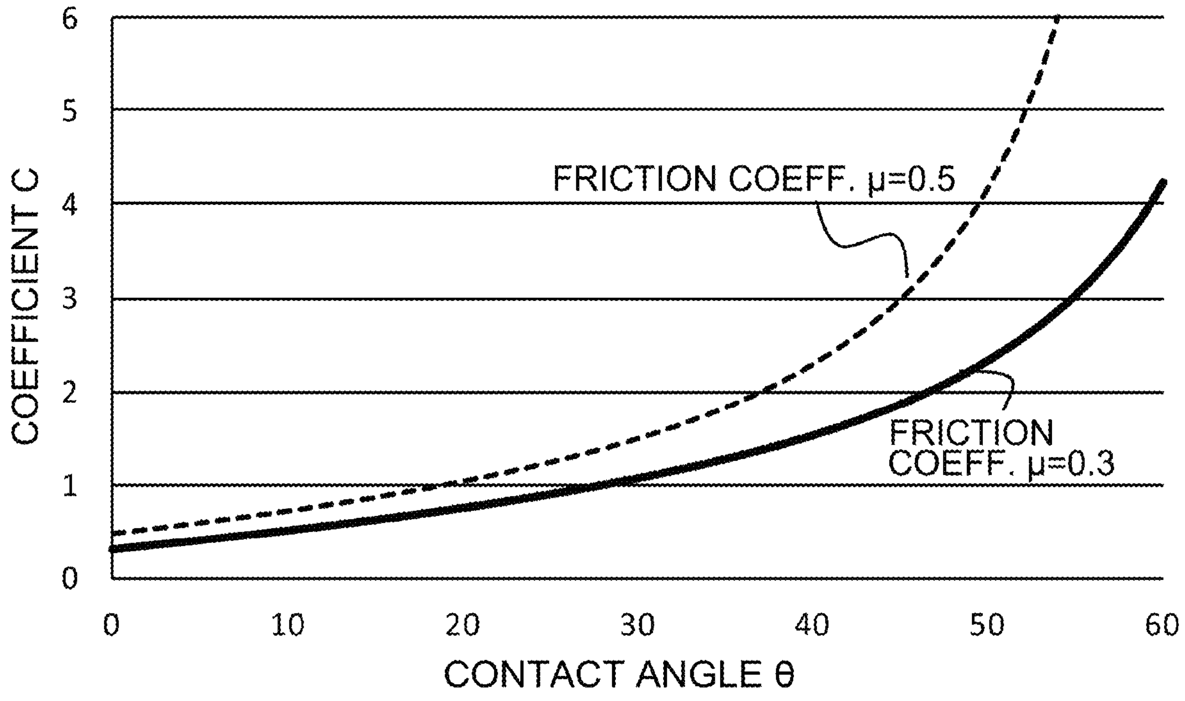

FIG. 15 is a graph showing the relationship between the contact angle and the coefficient C.

Figure 16:
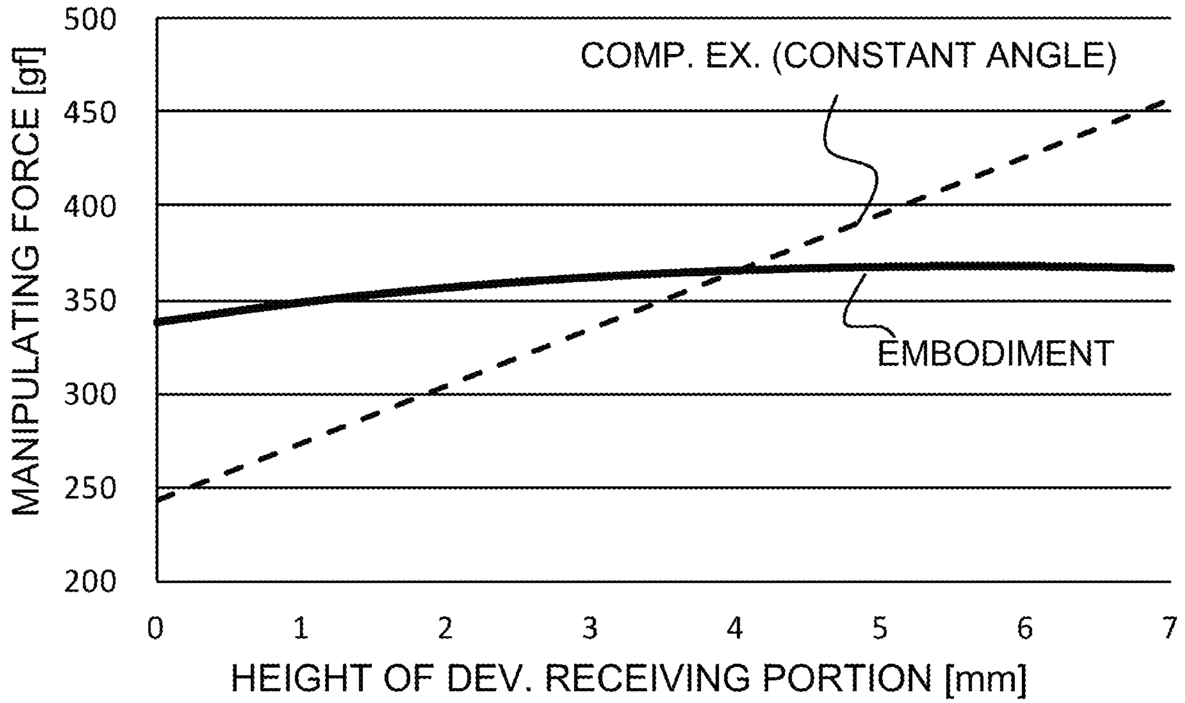

FIG. 16 is a graph showing the relationship between the height of the developer receiving portion and the operating force.

Figure 17:
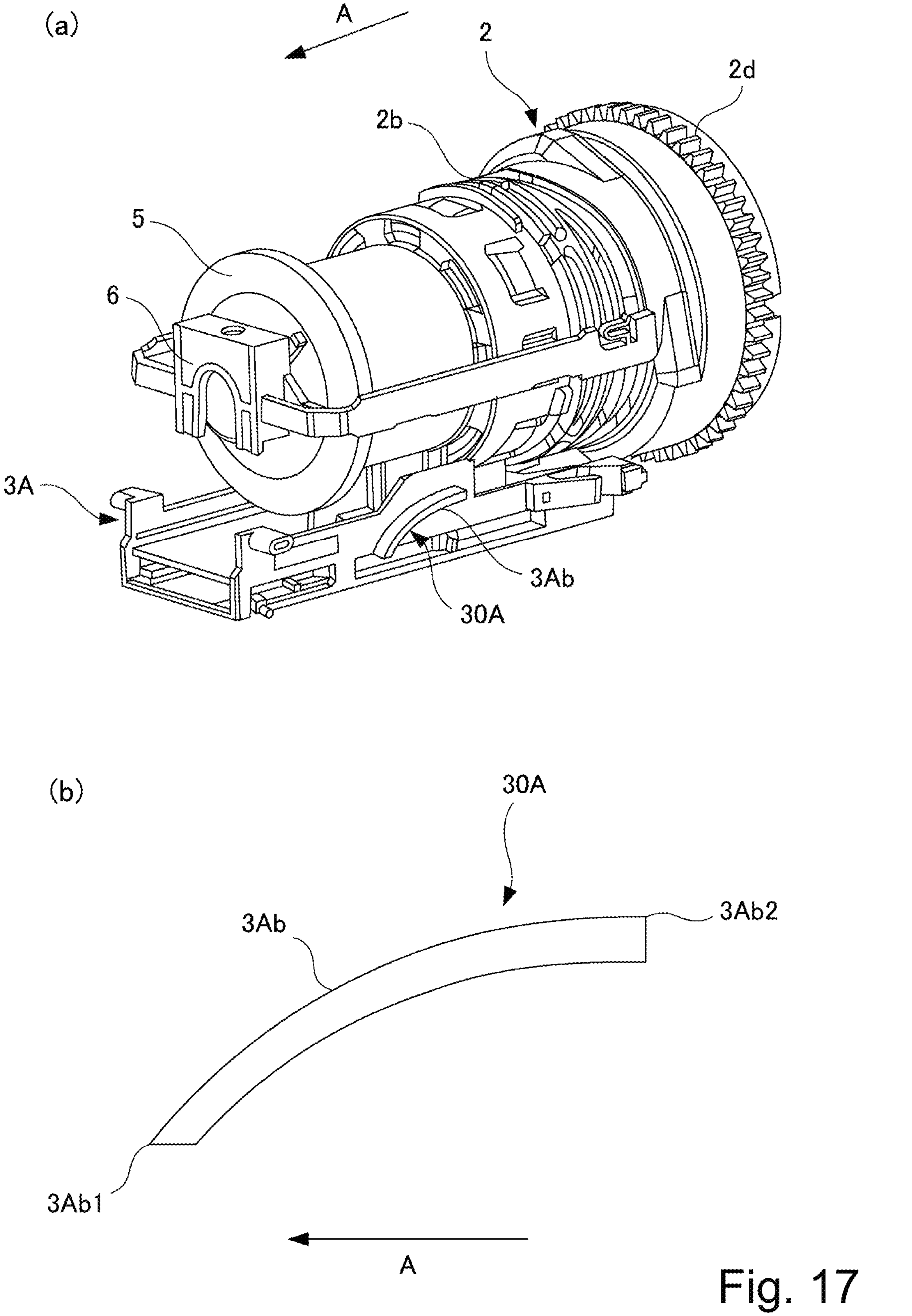

Parts (a) and (b) of FIG. 17 show the developer supply container according to Embodiment 2, in which part (a) is a perspective view illustrating the end portion of the developer supply container with the cover removed, and part (b) is a side view of the engagement portion.

Figure 18:
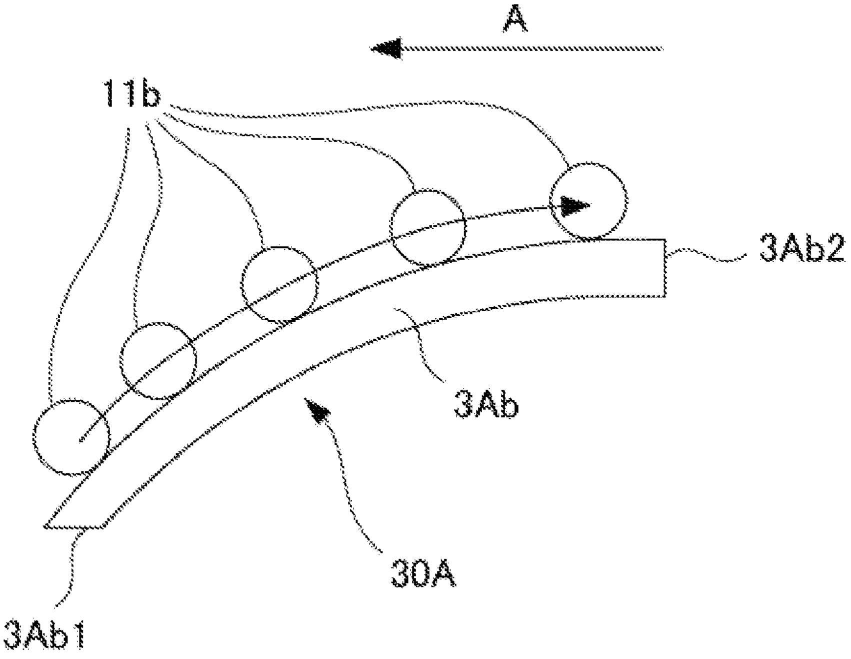

FIG. 18 is a schematic illustration showing the relationship between the engaged portion and the engaging portion in the developer supplying container mounting operation in Embodiment 2.

Figure 19:
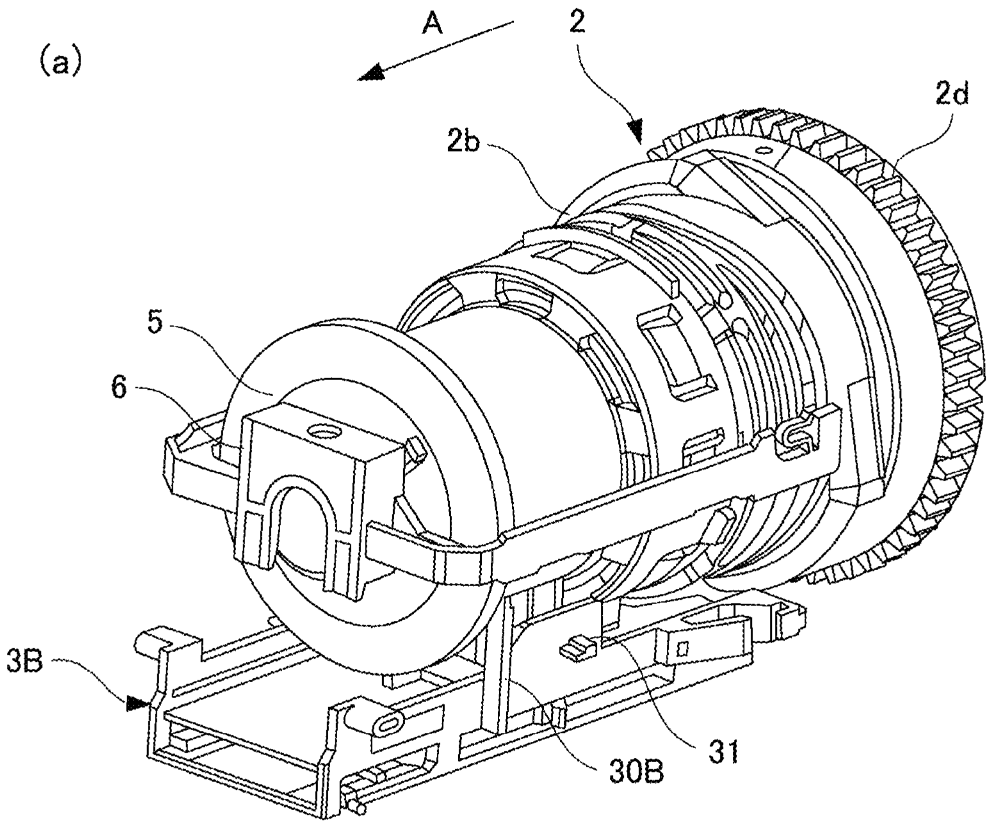
Figure 19:
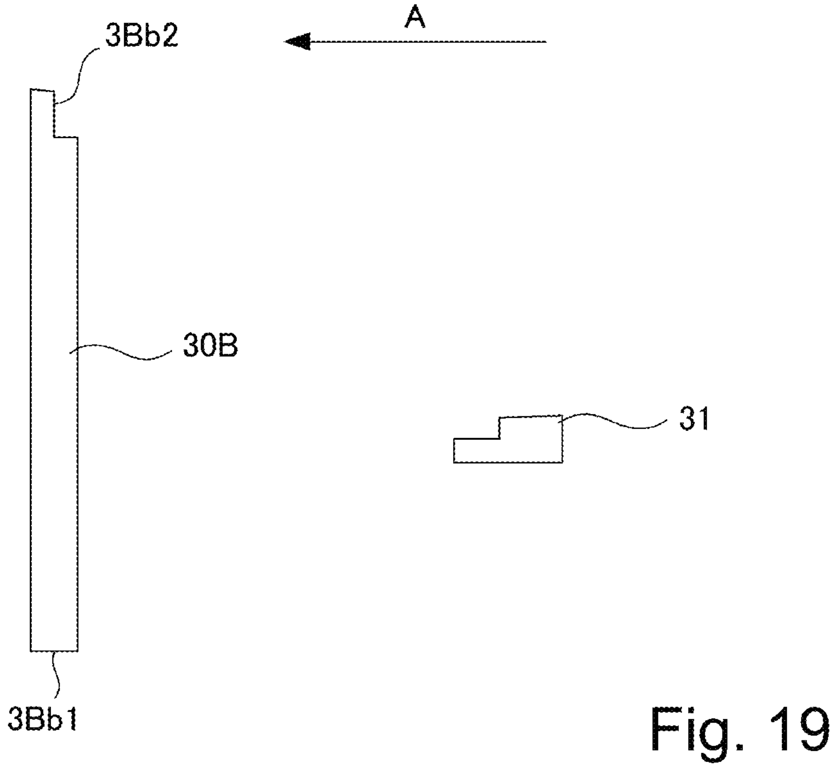

Part (a) and part (b) of FIG. 19 show the developer supply container according to Embodiment 3, in which part (a) is a perspective view illustrating an end portion of the developer supply container in a state that the cover is removed, and part (b) is a side view of the engagement portion before engaging with the engaged portion.

Figure 20:
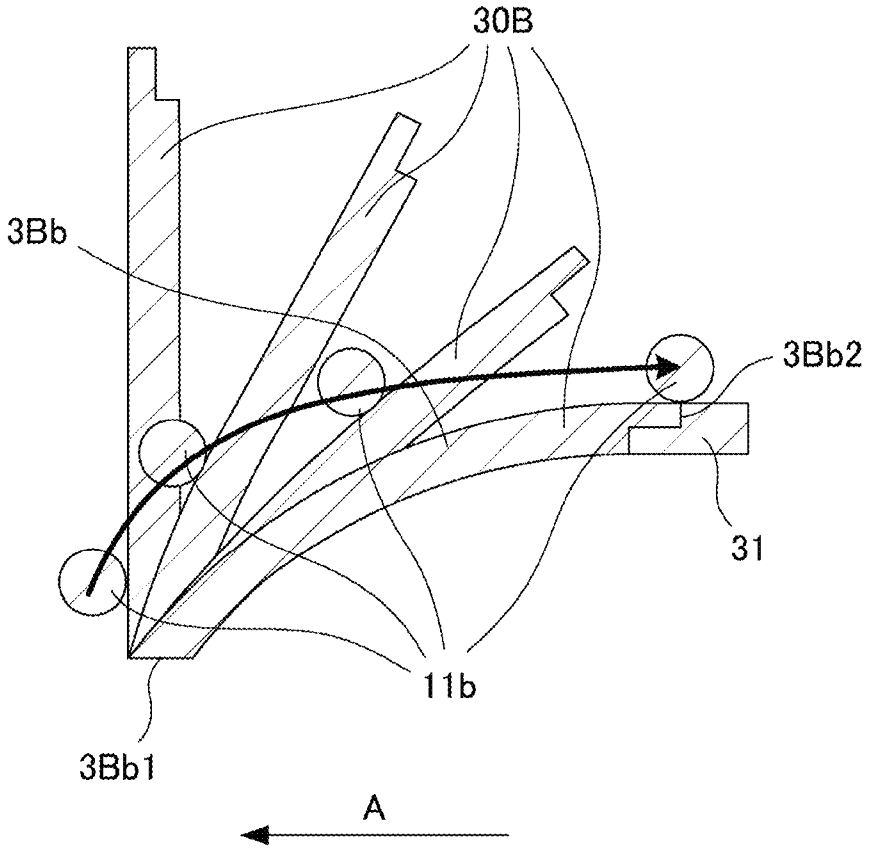

FIG. 20 is a schematic illustration showing the relationship between the engaged portion and the engaging portion during the mounting operation of the developer supply container, in Embodiment 3.

Figure 21:
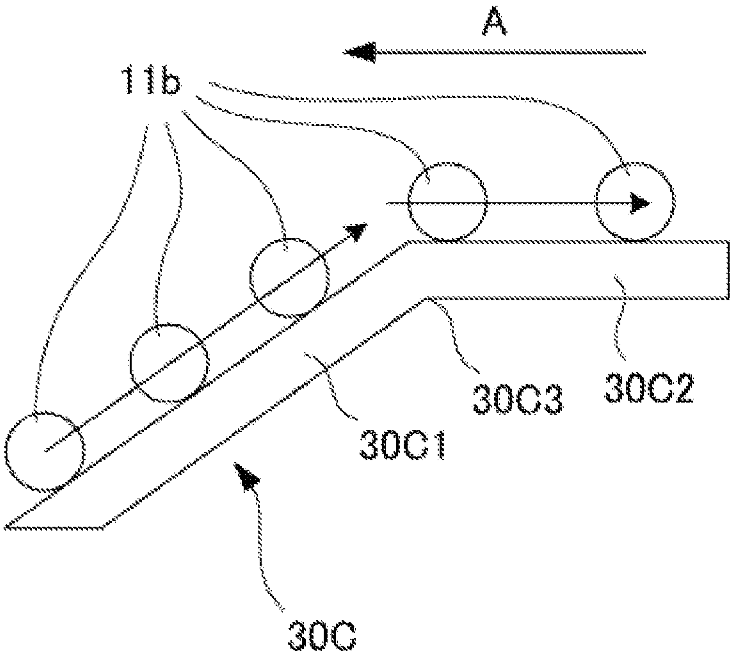
Fig. 21 Prior Art

FIG. 21 is a schematic illustration showing the relationship between the engaged portion and the engaging portion during the mounting operation of the developer supply container in Comparative Example 2.

DESCRIPTION OF THE EMBODIMENTS

Embodiment 1

In the following, referring to FIGS. 1-18, Embodiment 1 of the present invention will be described. First, referring to FIG. 1 and FIG. 2, a schematic structure of the image forming apparatus of this embodiment will be described.

[Image Forming Apparatus]

Figure 1:
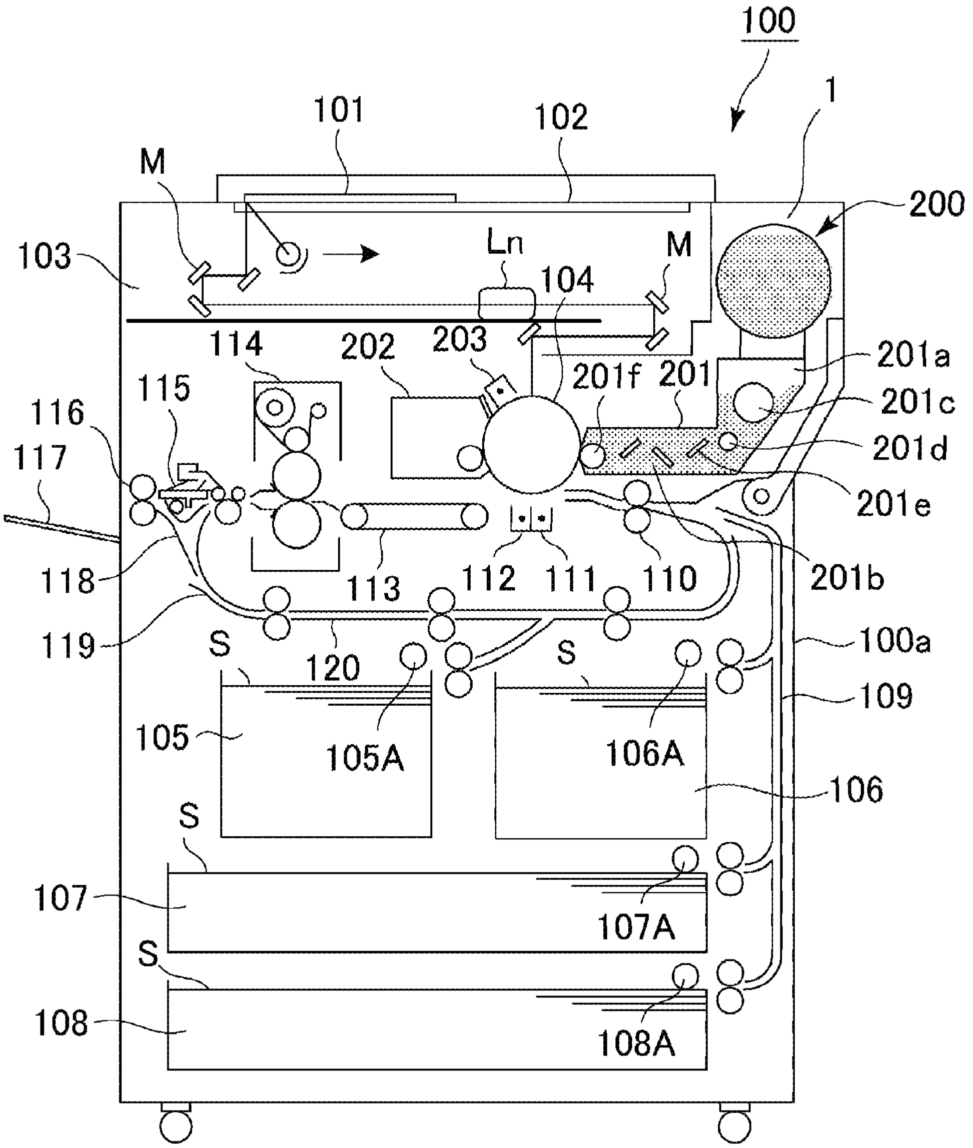
FIG. 1 shows a schematic structure diagram of an image forming apparatus according to Embodiment 1.

In FIG. 1, the image forming apparatus 100 includes an original reading device 103 at a top of a main assembly 100*a* of the image forming apparatus. An original 101 is placed on an original platen glass 102. A light image corresponding to image information of the original 101 is imaged, using a plurality of mirrors M and the lens Ln of the original reading device 103, on a photosensitive drum 104 which is a cylindrical photosensitive member as an image bearing member to form an electrostatic latent image. This electrostatic latent image is visualized using toner (one component magnetic toner) as a developer (dry powder) by a dry type developing device (one-component developing device) 201. Here, in this embodiment, a one-component magnetic toner is used as the developer to be supplied from the developer supply container 1 (also referred to as a toner cartridge), but the present invention is not limited to such an example, and it may be of a structure as will be described hereinafter.

More specifically, in the case of using a one-component developing device which performs developing operation with one component nonmagnetic toner, one component nonmagnetic toner is supplied as a developer. In addition, non-magnetic toner is supplied as the developer when using a two-component developer which develops the image using a two component developer prepared by mixing magnetic carrier and nonmagnetic toner. In this case, as the developer, a structure may be employed in which the magnetic carrier is also supplied together with the non-magnetic toner.

As described above, a developing device 201 shown in FIG. 1 develops the electrostatic latent image formed on the photosensitive drum 104 using the toner as the developer based on the image information of the original 101. In addition, a developer supplying system 200 is connected to developing machine 201, and the developer supplying system 200 includes a developer supply container 1 and a developer receiving apparatus 8 relative to which the developer supply container 1 is mountable and dismountable. Developer supplying system 200 will be described hereinafter.

The developing device 201 includes a developer hopper portion 201*a* and a developing roller 201*f*. In this developer hopper portion 201*a*, a stirring member 201*c* for stirring the developer supplied from the developer supply container 1 is provided. The developer stirred by the stirring member 201*c* is fed to a feeding member (201*e*) side by a feeding member 201*d*. And, the developer which has been sequentially fed by the feeding members 201*e* and 201*b* is carried on the developing roller 201*f* and finally supplied to a developing zone where it is opposed to the photosensitive drum 104. In this embodiment, a one-component developer is used, and therefore, toner as a developer from the developer supply container 1 is supplied to the developing device 201, but when using a two component developer, toner and carrier as a developer may be supplied from the developer supply container.

Cassettes 105 to 108 contain recording materials S such as sheets of paper. When an image is to be formed, a cassette containing an optimum recording material S among the sheets contained in these cassettes 105 to 108 is selected on the basis of the information inputted by the operator (user or service person) on the operation portion 100*d* of the image forming apparatus 100 or on the basis of the size of the original 101. Here, as for the recording material S, it is not limited to sheets of paper, but it may be an OHP sheet or the like as the case may be. One sheet of recording material S fed by the feeding and separating devices 105A to 108A is fed to registration rollers 110 by way of a feeding portion 109. Then, the recording material S is fed in synchronization with the rotation of the photosensitive drum 104 and the scan timing of the original reading device 103.

A transfer charging device 111 and a separation charging device 112 are provided at positions opposing the photosensitive drum 104 on a downstream side of the registration roller 110 in the recording material feeding direction. The image of the developer (toner image) formed on the photosensitive drum 104 is transferred onto the recording material S fed by the registration roller 110, by a transfer charging device 111. And, the recording material S onto which the toner image is transferred is separated from the photosensitive drum 104 by a separation charging device 112. Subsequently, heat and pressure are applied to the recording material S fed by the feeding portion 113 in a fixing portion 114, so that the toner image is fixed on the recording material. Thereafter, the recording material S to which the toner image is fixed passes through a discharge/reversing portion 115 and is discharged to the discharge tray 117 by the discharge roller 116, in case of single-sided copy.

On the other hand, in case of double-sided copy, the recording material S passes through the discharge/reversing portion 115, and the recording material S is partly discharged to the outside of the apparatus once by the discharge roller 116. After this, at the timing when a trailing end of the recording material S passes through the switching member 118 and is still nipped by the discharge rollers 116, the position of the switching member 118 is switched, and the discharge roller 116 is rotated counterclockwise, by which the recording material S is fed again into the apparatus. Thereafter, the recording material S is fed to the registration roller 110 by way of the re-feeding and feeding portions 119 and 120, and is discharged to the discharge tray 117 by way of the same path as in the case of single-sided copying.

In the image forming apparatus 100 having the above-described structure, image forming process devices such as a developing device 201, a cleaner portion 202, a primary charging device 203 and the like are provided around the photosensitive drum 104. Here, the developing device 201 supplies the developer to the electrostatic latent image formed on the photosensitive drum 104 on the basis of the image information of the original 101 read by the original reading device 103 so as to develop the electrostatic latent image. In addition, the primary charging device 203 uniformly charges the surface of the photosensitive drum to form a desired electrostatic latent image on the photosensitive drum 104. Furthermore, the cleaner portion 202 has a function of removing the developer remaining on the photosensitive drum 104.

Figure 2:
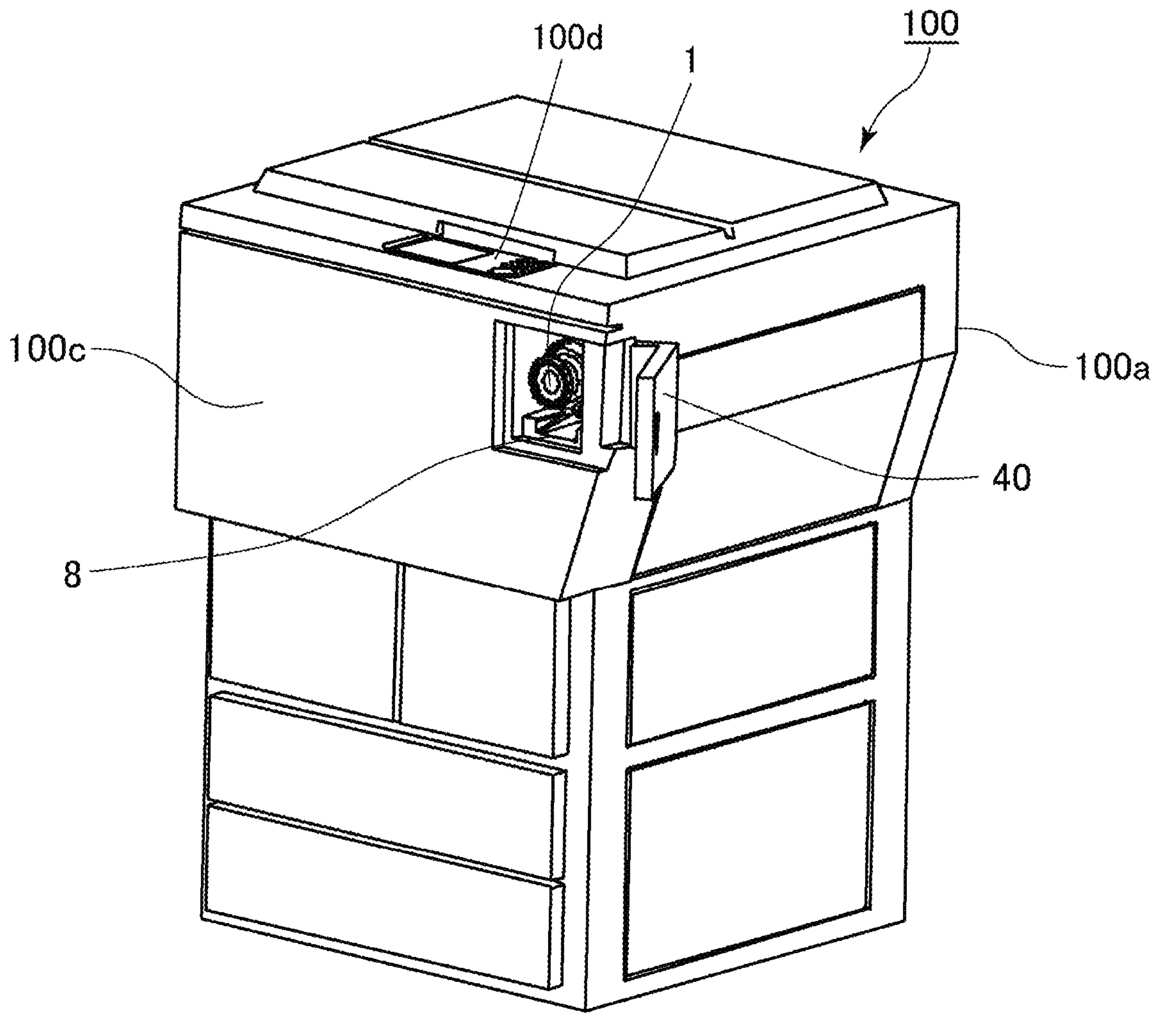
FIG. 2 is a perspective view of the image forming apparatus according to Embodiment 1.

As shown in FIG. 2, when the operator opens a replacement cover 40 which is a portion of an outer cover of the apparatus main assembly 100*a* of the image forming apparatus 100, a part of the developer receiving apparatus 8 which will be described hereinafter can be seen. And, by inserting the developer supply container 1 into this developer receiving apparatus 8, the developer supply container 1 is mounted in a state where it can supply the developer to the developer receiving apparatus 8. On the other hand, when the operator exchanges the developer supply container 1, it carries out the operation opposite to the loading operation, by which the developer supply container 1 is dismounted from the developer receiving apparatus 8, and thereafter a new developer supply container 1 can be mounted. Here, the replacement cover 40 is a cover exclusively for mounting/dismounting (exchanging) the developer supply container 1, and is opened and closed only for dismounting/mounting the developer supply container 1. On the other hand, the maintenance operation for the image forming apparatus 100 is performed by opening/closing a front cover 100*c*. Here, the replacement cover 40 and the front cover 100*c* may be integrated. In such a case, the replacement of the developer supply container 1 and the maintenance of the image forming apparatus 100 are performed by opening and closing the integrated cover (not shown).

[Developer Receiving Apparatus]

Next, referring to part (a) of FIG. 3 to part (c) of FIG. 4, the developer receiving apparatus 8 constituting the developer supplying system 200 will be described. As shown in part (a) of FIG. 3, the developer receiving apparatus 8 is provided with a mounting portion (mounting space) 8*f* to which the developer supply container 1 is dismountably mounted. The mounting portion 8*f* is provided with an insertion guide 8*e* for guiding the developer supply container 1 in the mounting and dismounting directions. In the case of this embodiment, the structure is such that the mounting direction of the developer supply container 1 is the direction indicated by A, and the dismounting direction B of the developer supply container 1 is opposite to the direction A of mounting the developer supply container 1, by the insertion guide 8*e*.

As shown in part (a) of FIG. 3 to part (a) of FIG. 4, the developer receiving apparatus 8 has a drive gear 9 which functions as a driving mechanism for driving the developer supply container 1. A rotational driving force is transmitted to the actuating gear 9 from a driving motor 500 by way of a driving gear train (not shown), so that the actuating gear 9 applies the rotational driving force to the developer supply container 1 mounted in the mounting portion 8*f*. The operation of the driving motor 500 is controlled by the control device 600.

In addition to controlling the driving motor 500, the control device 600 controls overall of the image forming apparatus 100. The control device 600 has a CPU (Central Processing Unit), a ROM (Read Only Memory), and a RAM (Random Access Memory). The CPU controls each portion while reading the program corresponding to a control procedure stored in the ROM. In addition, working data and an input data are stored in the RAM, and the CPU executes control while looking up the data stored in the RAM on the basis of the program etc.

In the mounting portion 8*f* of the developer receiving apparatus 8, there is provided a developer receiving portion 11 for receiving the developer discharged out of the developer supply container 1. The developer receiving portion 11 is connected to a container discharge opening 3*a*4 (part (b) of FIG. 5) of the developer supply container 1 when the developer supply container 1 is mounted, and has a receiving opening 11*a* for receiving the developer discharged through the container discharge opening 3*a*4. The developer receiving portion 11 is mounted so as to be movable (displaceable) in the direction in which the receiving opening 11*a* moves toward and away from the container discharge opening 3*a*4 (in this embodiment, the direction crossing with the direction in which the developer supply container 1 is mounted (more specifically, vertical direction relative to the developer receiving apparatus 8)). In the case of this embodiment, as shown in part (b) of FIG. 3, the developer receiving portion 11 is urged by an urging member (spring) 12 as urging means in a direction in which the receiving opening 11*a* moves away from the container discharge opening 3*a*4 (vertically downward). That is, the urging member 12 urges the developer receiving portion 11 in a direction opposite to the direction in which it displaces in accordance with the mounting operation of the developer supply container 1. Therefore, when the receiving opening 11*a* moves toward the container discharge opening 3*a*4 (upward in the vertical direction), the developer receiving portion 11 moves against the urging force of the urging member 12.

In addition, as shown in part (a) of FIG. 4, a first shutter stopper portion 8*a* and a second shutter stopper portion 8*b* are provided on the mounting portion 8*f* of the developer receiving apparatus 8 in the upstream side, in the mounting direction (direction of arrow A), of the developer receiving portion 11. In the developer supplying container 1 which is moving relative to the developer receiving apparatus 8 during mounting and dismounting, the first and second shutter stopper portions 8*a* and 8*b* restrict relative movement of the shutter 4 only (part (a) of FIG. 10 and the like) with respect to the developer receiving apparatus 8, which will be described later. In this case, the shutter 4 moves relative to a portion of the developer supply container 1 other than the shutter 4, such as the container body 2 and the like which will be described later.

As shown in part (b) of FIG. 3 and part (b) of FIG. 4, below the developer receiving apparatus 8 in the vertical direction, a sub hopper 8*c* for temporarily storing the developer supplied from the developer supply container 1 is provided. In this sub hopper 8*c*, a feeding screw 14 for feeding the developer to a developer hopper portion 201*a* (FIG. 1) which is a portion of the developing device 201, and an opening 8*d* communicating with the developer hopper portion 201*a* are provided.

As shown in part (c) of FIG. 4, a main assembly seal 13 formed so as to surround the receiving opening 11*a* is provided in the developer receiving portion 11. The main assembly seal 13 comprises an elastic member, foam and so on. With the developer supply container 1 mounted, the main assembly seal 13 and an opening seal 3*a*5 (part (b) of FIG. 5) surrounding the container discharge opening 3*a*4 of the developer supply container 1 sandwich the shutter 4 in close contact therewith. By this, the developer discharged from the container discharge opening 3*a*4 of the developer supply container 1 through the shutter opening 4*j* (discharge port) of the shutter 4 to the receiving opening 11*a* is prevented from leaking out of the receiving opening 11*a* (developer feed path).

Here, it is desirable that a diameter of the receiving opening 11*a* is substantially the same as or slightly larger than a diameter of the shutter opening 4*j* of the shutter 4, in order to prevent the interior of the mounting portion 8*f* from being contaminated by the developer. This is because if the diameter of the receiving opening 11*a* is smaller than the diameter of the shutter opening 4*j*, the developer discharged from the shutter opening 4*j* is more likely to be deposited on the upper surface of the main assembly seal 13. If the developer is deposited on the lower surface of the developer supply container 1 at the time of mounting/dismounting operation of the developer supply container 1, it becomes a cause of contamination by the developer. In view of this point, it is preferable that the diameter of the receiving opening 11*a* is roughly the same as or about 2 mm larger than the diameter of the shutter opening 4*j*. For example, in the case that the diameter of the shutter opening 4*j* of the shutter 4 is a fine hole (pinhole) of about 2 mm in diameter, it is preferable that the diameter of the receiving opening 11*a* is about 3 mm.

In addition, as shown in part (c) of FIG. 4, on the side surface of the developer receiving portion 11, an engaged portion (portion to be engaged) 11*b* projecting toward the center side is provided. In the case of this embodiment, the engaged portion 11*b* is directly engaged with the engaging portion 30 (part (a) in FIG. 7) provided in the developer supply container 1 which will be described hereinafter, and is guided by the engaging portion 30, by which the developer receiving portion 11 is lifted toward the developer supply container 1 in the upward direction.

[Developer Supply Container]

Next, referring to part (a) FIG. 5 to part (b) of FIG. 12, the developer supply container 1 constituting the developer supplying system 200 will be described. First, referring to part (a) of FIG. 5 and part (b) of FIG. 5, the overall structure of the developer supply container 1 will be described. The developer supply container 1 mainly includes the container body 2, a flange portion 3, the shutter 4, a pump portion 5, a reciprocating member 6, and a cover 7. The developer supply container 1 supplies the developer to the developer receiving apparatus 8 by rotating in the developer receiving apparatus 8 in the direction indicated by an arrow R about the rotation axis P shown in part (a) of FIG. 5. In the following, each element constituting the developer supply container 1 will be described in detail.

[Container Body]

As shown in FIG. 6, the container body 2 mainly comprises a developer accommodating portion 2*c* for containing the developer. In addition, the container body 2 is provided with a helical feeding groove 2*a* (feeding portion) for feeding the developer in the developer accommodating portion 2*c* by rotating the container body 2 in the direction of the arrow R around the rotation axis P. In addition, as shown in FIG. 6, a cam groove 2*b* and a drive receiving portion 2*d* for receiving a driving force from the main assembly side are integrally formed over the entire periphery of the outer circumferential surface of the container body 2 on one end side. Here, in this embodiment, the cam groove 2*b* and the drive receiving portion (gear) 2*d* are integrally formed with the container body 2, but the cam groove 2*b* or the drive receiving portion 2*d* may be formed as a separate member and may be integrally mounted to the container body 2. In addition, in this embodiment, for example, a toner including a volume average particle diameter of 5 μm to 6 μm is accommodated in the developer accommodating portion 2*c* as the developer. In addition, in this embodiment, the developer accommodating portion 2*c* includes not only the container body 2 but also the interior spaces of the flange portion 3 and the pump portion 5 which will be described hereinafter.

[Flange Portion]

Referring to part (a) of FIG. 5, part (b) of FIG. 5, part (a) of FIG. 7 through part (d) of FIG. 9, the flange portion 3 will be described. The flange portion 3 is mounted so as to be rotatable relative to the container body 2 about the rotation axis P. And, when the developer supply container 1 is mounted to the developer receiving apparatus 8, the flange portion 3 is held so as not to rotate in the arrow R direction relative to the mounting portion 8*f* (part (a) of FIG. 3). In addition, as shown in part (b) of FIG. 7, a container discharge opening 3*a*4 is provided in a portion of the flange portion 3, and an opening seal 3*a*5 is mounted to the periphery thereof. As shown in parts (a) and (b) of FIG. 5, the flange portion 3 is provided with the pump portion 5, the reciprocating member 6, the shutter 4, and the cover 7.

First, as shown in part (b) of FIG. 5, the pump portion 5 is threaded at one end side of the flange portion 3, and the container body 2 is connected to the other end side with a sealing member (not shown) therebetween. In addition, a reciprocating member 6 is provided so as to sandwich the pump portion 5, and the engaging projection 6*b* (parts (a) and (b) of FIG. 12) provided on the reciprocating member 6 is engaged with the cam groove 2*b* (FIG. 6). The flange portion 3 is provided with the shutter 4. In this embodiment, the flange portion 3 and the shutter 4 constitute a discharge portion 300 for discharging the developer accommodated in the developer accommodating portion 2*c* out. In addition, the surface on which the shutter 4 is provided is the bottom side of the flange portion 3. In addition, in order to improve the outer appearance and to protect the reciprocating member 6 and the pump portion 5, a cover 7 is integrally provided so as to cover the flange portion 3, the pump portion 5, and the reciprocating member 6 as a whole, as shown in part (b) of FIG. 5.

[Engaging Portion]

The flange portion 3, as shown in part (a) of FIG. 7, is provided with an engaging portion 30 engageable with the engaged portion 11*b* (part (c) of FIG. 4) of the developer receiving portion 11. The engaging portion 30 displaces the developer receiving portion 11 toward the developer supply container 1 according to the mounting operation of the developer supply container 1 and connects them to each other, so that it becomes possible to replenish the developer from the developer supply container 1 to the developer receiving portion 11. In addition, along with the removal operation of the developer supply container 1, the engaging portion 30 performs guiding such that the developer receiving portion 11 is displaced in a direction away from the developer supply container 1, by which the connection state between the developer supply container 1 and the developer receiving portion 11 is ceased.

As shown in parts (a) of FIG. 7 through part (b) of FIG. 8, the engaging portion 30 has a curved portion 3*b* and a parallel portion (extending portion) 3*c*. Part (c) of FIG. 5 is a front view of the developer supply container 1. As shown in part (c) of FIG. 5, the engaging portion 30 (the curved portion 3*b*, the parallel portion 3*c*) is disposed below a plane H including the rotational axis P. Also, the plane H including the rotational axis P is a horizontal plane, and the engaging portion 30 is disposed below this horizontal plane. The curved portion 3*b* displaces the developer receiving portion 11 in a direction crossing the mounting direction of the developer supply container 1, so that an unsealing operation of the developer receiving portion 11 is performed. In this embodiment, along with the mounting operation of the developer supply container 1, the curved portion 3*b* displaces the developer receiving portion 11 toward the developer supply container 1, so that the developer receiving portion 11 is connected to a portion of the opening seal 3*a*5 of the developer supply container 1. In order to accomplish this, the curved portion 3*b* extends in a direction crossing with the mounting direction of the developer supply container 1. More specifically, the curved portion 3*b* has a curved surface which is curved to guide the engaged portion 11*b* so that the receiving opening 11*a* of the developer receiving portion 11 communicates with the container discharge opening 3*a*4 in accordance with the mounting operation of the developer supply container 1. Although details will be described hereinafter, the engaging portion of this embodiment has the following structure. The inclined portion (first portion) 3*b* and the parallel portion (second portion) 3*c* extending from the lower end (the first position) toward the upper end (the second position) constitute the tracks where the engaged portion 11*b* passes. And, as shown in part (c) of FIG. 5, the track is arranged below the plane H. Also, when the plane including the rotation axis is imagined, the discharge opening and the track are provided in the same region (lower region). In such a case, the parallel portion 3*c* is disposed at a position closer to the horizontal plane H or the imaginary plane than the inclined portion 3*b*. Also, in this embodiment, in the developer receiving portion 11, the engaged portion 11*b* and the receiving opening are on the same plane perpendicular to the rotation axis P. As a result, the engaged portion 11*b* and the parallel portion 3*c* are on the same plane perpendicular to the rotation axis P. The engaged portion 11*b* is engaged with this track, and the engaged portion 11*b* is lifted so that the discharge opening and the receiving opening can communicate with each other. And, when the communication path is formed, a discharge path is formed between the inside of the developer supply container and the discharge opening so that the developer in the developer supply container can be discharged toward the receiving port.

In particular, in this embodiment, the curved portion 3*b* is formed such that which the angle (contact angle) relative to the mounting direction becomes smaller toward the upstream (direction opposite to the direction of arrow A) in the mounting direction of the developer supply container 1. That is, as shown in part (a) of FIG. 8, the contact angle at an arbitrary first position in the mounting direction of the curved portion 3*b* is θ1, and as shown in part (b) of FIG. 8, the contact angle at an arbitrary second position on the upstream side of the above arbitrary first position of the curved portion 3*b* in the mounting direction is θ2. In this case, the curved portion 3*b* is formed so as to satisfy $\theta 2<\theta 1$. More specifically, the surface (upper surface) engaged with the engaged portion 11*b* of the curved portion 3*b* is curved so as to be convex up. In addition, the curved portion 3*b* is provided from a position at which engagement of the engaged portion 11*b* starts with the mounting operation of the developer supply container 1.

The parallel portion (engagement surface) 3*c* smoothly continues with the upstream end portion, in the mounting direction of the curved portion 3*b* and extends substantially in parallel with the mounting direction. The parallel portion 3*c* maintains the position of the developer receiving portion 11, so that the container discharge opening 3*a*4 communicates with the receiving opening 11*a* of the developer receiving portion 11 in accordance with the mounting operation of the developer supply container 1. That is, while the developer supply container 1 relatively moves with respect to the shutter 4 after the developer receiving portion 11 is connected to a portion of the opening seal 3*a*5 of the developer supply container 1, a state in which the main assembly seal 13 and the opening seal 3*a*5 are connected is maintained. In other words, while the receiving opening 11*a* is connected to a portion of the opening seal 3*a*5 and moves to the container discharge opening 3*a*4, the state in which the main assembly seal 13 and the opening seal 3*a*5 are connected is maintained, and the receiving opening 11*a* is made to communicate with the container discharge opening 3*a*4. In order to accomplish this, the parallel portion 3*c* extends in a direction parallel to the mounting direction of the developer supply container 1. More specifically, the surface on which the engaged portion 11*b* of the parallel portion 3*c* engages is a substantially horizontal surface. In this embodiment, the engaging portion (parallel portion 3*c*) engaged with the engaged portion 11*b* is substantially parallel to the mounting direction or the rotational axis P, but the engaging portion corresponding to the parallel portion 3*c* of this embodiment is not limited to parallel, and it may be inclined. Here, in this embodiment, the surface perpendicular to the rotation axis of the developer supply container and passing through the container discharge opening 3*a*4 passes through this parallel portion.

When the developer supply container 1 is mounted on the developer receiving apparatus 8, the engaged portion 11*b* of the developer receiving portion 11 is first brought into contact with the downstream end portion of the engaging portion 30, in the mounting direction, of the curved portion 3*b*, as shown in part (a) of FIG. 9 to part (b) of FIG. 9. And, as shown in part (c) of FIG. 9, the engaged portion 11*b* is guided along a shape of the curved portion 3*b* with the movement of the developer supply container 1 in the mounting direction (the direction of the arrow A). As described in the foregoing, the developer receiving portion 11 is movable only in a direction (vertical direction) perpendicular to the mounting direction of the developer supply container 1. In order to accomplish this, in the developer receiving portion 11, the engaged portion 11*b* is guided along the curved portion 3*b* by the mounting operation of the developer supply container 1 so that it is displaced upward in the vertical direction (direction of arrow D), that is, the direction approaching the developer supply container 1. Also, when the developer supply container 1 is inserted, as shown in part (d) of FIG. 9, the engaged portion 11*b* rides on the parallel portion 3*c* and moves, so that and the receiving opening 11*a* becomes in a state of communicating with the container discharge opening 3*a*4. Here, as shown in part (d) of FIG. 9, the container discharge opening 3*a*4 and the parallel portion 3*c* have a relationship that a plane L passing through the container discharge opening 3*a*4 and perpendicular to the rotation axis P passes through the parallel portion 3*c*. In addition, the plane including the parallel portion 3*c* is disposed between the rotation axis P and the container discharge opening 3*a*4.

Here, as previously described, the developer receiving portion 11 is urged downward in the vertical direction by the urging member 12 (part (b) of FIG. 3). In order to accomplish this, when removing the developer supply container 1, the engaged portion 11*b* of the developer receiving portion 11 is guided along the curved portion 3*b* and displaced in a direction away from the developer supply container 1, as the developer supply container 1 moves in the direction opposite to the arrow A direction.

[Shutter]

Next, referring to parts (a) and (b) of FIG. 9 the shutter 4 will be described. The shutter 4 slidable on the shutter insertion portion 3*d* (part (a) of FIG. 7) of the flange portion 3 move relative to a portion (flange portion 3) of the developer supply container 1. The shutter 4 has a shutter opening 4*j* as a discharge opening, and opens and closes the container discharge opening 3*a*4 (part (b) in FIG. 7) of the developer supply container 1 in accordance with the mounting and dismounting operation of the developer supply container 1. That is, by moving the shutter 4 relative to the developer supply container 1 in accordance with the mounting operation of the developer supply container 1, the receiving opening 11*a* of the developer receiving portion 11 and the shutter opening 4*j* communicate with each other, and in addition with the container discharge opening 3*a*4. By this, the developer in the developer supply container 1 can be discharged to the receiving opening 11*a*. That is, the discharge portion 300 (part (b) of FIG. 5) for discharging the developer is constituted by the flange portion 3 and the shutter 4, and the shutter 4 of the discharge portion 300 is provided with the shutter opening 4*j* as the discharge opening for discharging the developer.

On the other hand, a developer sealing portion 4*a* is provided at a position deviated from the shutter opening 4*j* of the shutter 4. The developer sealing portion 4*a* closes the container discharge opening 3*a*4, and as the shutter 4 moves relative to the developer supply container 1 in accordance with the operation of taking out the developer supply container 1. In addition, the developer sealing portion 4*a* prevents leakage of the developer from the container discharge opening 3*a*4, when the developer supply container 1 is not mounted to the mounting portion 8*f* (part (a) of FIG. 3) of the developer receiving apparatus 8. Here, the shutter 4 is engaged with the flange portion 3 in an attitude in which the developer sealing portion 4*a* faces upward.

The shutter 4 is provided with a first stopper portion 4*b* and a second stopper portion 4*c* held by first and second shutter stopper portions 8*a* and 8*b* (part (a) of FIG. 4) of the developer receiving apparatus 8 doing so that the developer supply container 1 is capable of moving relative to the shutter 4. In addition, the shutter 4 is provided with a support portion 4*d* for displaceably supporting the first and second stopper portions 4*b* and 4*c*. The support portion 4*d* is elastically deformable and extends from one side to other side of the developer sealing portion 4*a*. And, the first stopper portion 4*b* and the second stopper portion 4*c* are provided at the free end portion of the support portion 4*d*. By this, the first and second stopper portions 4*b*, 4*c* can be displaced by the elasticity of the support portion 4*d*.

Here, the first stopper portion 4*b* is inclined so that an angle α formed by the first stopper portion 4*b* and the support portion 4*d* is an acute angle. On the contrary, the second stopper portion 4*c* is inclined so that an angle β formed by the second stopper portion 4*c* and the support portion 4*d* is an obtuse angle.

When the developer supply container 1 is mounted, the first stopper portion 4*b* is engaged with the guide portion 8*g* of the developer receiving apparatus 8 and is displaced to pass through the second shutter stopper portion 8*b*, thus engaging with the first shutter stopper portion 8*a*. By engaging the first stopper portion 4*b* and the first shutter stopper portion 8*a*, the position of the shutter 4 with respect to the developer receiving apparatus 8 is fixed, and the shutter 4 and the developer supply container 1 can move relative to each other. And, as the shutter 4 and the developer supply container 1 move relative to each other, the shutter opening 4*j* and the container discharge opening 3*a*4 are opened and closed. That is, when the developer supply container 1 is mounted, the developer can be discharged from the developer supply container 1, and when the developer supply container 1 is removed, the developer is not discharged from the developer supply container 1.

The second stopper portion 4*c* is engaged with the second shutter stopper portion 8*b* of the developer receiving apparatus 8 at the time of removing the developer supply container 1 so that the first stopper portion 4*b* disengages from the first shutter stopper portion 8*a*. By this, the shutter 4 is disengaged from the developer receiving apparatus 8.

[Pump Portion]

Referring to parts (a) and (b) of FIG. 11, the pump portion 5 will be described. The pump portion 5 alternately and repeatedly changes the internal pressure of the developer accommodating portion 2*c*, switching between a state lower than the atmospheric pressure and a state higher than atmospheric pressure by the driving force received by the drive receiving portion 2*d* of the container body 2 (FIG. 6). In this embodiment, in order to stably discharge the developer through the small container discharge opening 3*a*4 as described above, the pump portion 5 is provided at a portion of the developer supply container 1. The pump portion 5 is a displacement type pump in which a volume is changed. More specifically, the pump portion 5 employed in this embodiment has a bellows-like stretchable member capable of expanding and contracting.

The pressure inside the developer supply container 1 is changed by the expansion and contracting operations of the pump portion 5, and the developer is discharged by utilizing the pressure. More specifically, when the pump portion 5 is contracted, the interior of the developer supply container 1 is brought into a compressed state, and the developer is pushed out to discharge through the container discharge opening 3*a*4 of the developer supply container 1. In addition, when the pump portion 5 is expanded, the interior of the developer supply container 1 is brought into a reduced pressure state, and the air is taken in from the outside through the container discharge opening 3*a*4. By air taken in, the developer in the container discharge opening 3*a*4 and in the neighborhood of the storage portion 3*a*3 (part (a) in FIG. 7) that stores the developer transported from the container body 2 of the flange portion 3 is loosened and smoothly discharged.

That is, in the neighborhood of the container discharge opening 3*a*4 of the developer supply container 1 and the neighborhood of the storage portion 3*a*3, the developer in the developer supply container 1 may gather due to vibrations imparted when transporting the developer supply container 1 and so on, with the possible result that the developer is caked in this portion. Therefore, as described above, the air is taken in through the container discharge opening 3*a*4, so that it is possible to loosen the developer that has been caked. In addition, in the usual discharging operation of the developer, as air is taken in as described above, the air and the powder as the developer are mixed with the result that the flowability of the developer is enhanced, and therefore, clogging of the developer does not easily occur, as an additional advantage. By repeatedly performing the expansion and contracting operation as described above, the developer is discharged.

As shown in part (a) of FIG. 11, in the pump portion 5, a joint portion 5*b* is provided so as to be able to be joined with the flange portion 3 on the opening end side (dismounting direction B). In this embodiment, screw threads are formed as the joint portion 5*b*. In addition, as shown in part (b) of FIG. 11, the pump portion 5 has a reciprocating member engaging portion 5*c* which engages with the reciprocating member 6 (parts (a) and (b) of FIG. 12), which will be described hereinafter, on the other end side.

In addition, as shown in part (b) of FIG. 11, the pump portion 5 has a bellows-shaped expandable portion (bellows portion, expansion and contraction member) 5*a* in which crests and bottoms are alternately formed periodically. The expansion and contraction portion 5*a* is capable by being folded in the direction of the arrow A or expanded in the direction of the arrow B along the folding lines (with folding lines as the base point). Therefore, when the bellows-like pump portion 5 as employed in this embodiment, it is possible to reduce variations in volumetric change with respect to the expansion and contraction amount, and therefore, it is possible to accomplish the stable volumetric change.

Here, in this embodiment, polypropylene resin is used as the material of the pump portion 5, but the present invention is not limited to this example. As for the material (material) of the pump portion 5, any material may be used as long as it has an expansion and contraction function and is capable of changing the internal pressure of the developer accommodating portion by changing the volume. For example, ABS (acrylonitrile-butadiene-styrene copolymer), polystyrene, polyester, polyethylene, and so on are usable. Or, rubber, other stretchable materials or the like can also be used.

[Reciprocating Member]

Referring to parts (a) and (b) of FIG. 12, the reciprocating member 6 will be described. As shown in parts (a) and (b) of FIG. 12, in order to change the volume of the pump portion 5, the reciprocating member 6 is provided with a pump engaging portion 6*a* (part (b) of FIG. 11) which engages with the reciprocating member engaging portion 5*c* provided on the pump portion (part (b) of FIG. 10). In addition, the reciprocating member 6 is provided with an engaging projection 6*b* to be engaged with the above-described cam groove 2*b* (FIG. 6) at the time of assembly. The engaging projection 6*b* is provided at the free end portion of the arm 6*c* extending in the mounting and dismounting direction (arrows A and B in the Figure) from the neighborhood of the pump engaging portion 6*a*. In addition, the reciprocating member 6 is regulated in rotation around the rotation axis P (part (a) of FIG. 5) of the arm 6*c* by the reciprocating member holding portion 7*b* (part (b) of FIG. 13) of the cover 7 which will be described hereinafter. Therefore, when the container body 2 is driven by the drive receiving portion 2*d* by the driving gear 9, and the cam groove 2*b* rotates integrally, the reciprocating member 6 reciprocates back and forth in the directions A and B by the urging action of the engaging projection 6*b* fitted in the cam groove 2*b* and the reciprocating member holding portion 7*b* of the cover 7. Accordingly, the pump portion 5 engaged with the pump engaging portion 6*a* of the reciprocating member 6 by way of the reciprocating member engaging portion 5*c* expands and contracts in the direction B and the direction A.

[Cover]

Referring to parts (a) and (b) of FIG. 13, the cover 7 will be described. As described above, the cover 7 is provided as shown in part (b) of FIG. 5 for the purpose of improving the appearance of the developer supply container 1 and protecting the reciprocating member 6 and the pump portion 5. In more detail, the cover 7 is provided so as to cover the entirety of the flange portion 3, the pump portion 5, and the reciprocating member 6. As shown in part (a) of FIG. 13, the cover 7 is provided with a guide groove 7*a* to be guided by the insertion guide 8*e* (part (a) of FIG. 3) of the developer receiving apparatus 8. In addition, as shown in part (b) of FIG. 13, the cover 7 is provided with a reciprocating member holding portion 7*b* for restricting rotation of the reciprocating member 6 about the rotation axis P (part (a) of FIG. 5).

[Effect by Engagement Portion]

Next, the shape of the curved portion 3*b* of the engaging portion 30 of the flange portion 3 and its effect will be described in detail referring to parts (a), (b) of FIGS. 8 and 14 to 16. Parts (a) and (b) of FIG. 8 are side views of the flange portion 3 (detailed shape illustration of the engaging portion 30). FIG. 14 is an illustration showing the relationship of forces acting on the engaged portion 11*b* of the developer receiving portion 11 during the mounting operation of the developer supply container 1. FIG. 15 is a graph showing the relationship between the contact angle between the curved portion 3*b* of the engaging portion 30 and the engaged portion 11*b* and the coefficient C described later. FIG. 16 is a graph showing the relationship between the height position of the developer receiving portion 11 in the vertical direction and the insertion force (operating force) of the developer supply container 1.

As described in the foregoing, the shape of the surface engaged with the engaged portion 11*b* of the curved portion 3*b* is formed such that the angle with respect to the mounting direction (contact angle) becomes smaller toward the upstream, in the mounting direction, of the developer supply container 1. In other words, the upper surface of the curved portion 3*b* has a curved shape such that the contact angle with respect to the engaged portion 11*b* becomes an acute angle as the position is higher in the vertical direction.

Here, the description will be made about the force relationship when the curved portion 3*b* of the flange portion 3 and the engaged portion 11*b* of the developer receiving portion 11 are in contact with each other at a certain contact angle θ, referring to FIG. 14. As shown in FIG. 14, F is the force (operating force) for inserting the developer supplying container 1 (flange portion 3) (operating force), N is the vertical force applied to the curved portion 3*b* of the flange portion 3, friction coefficient is u, and T is the force (drag) required to lift the developer receiving portion 11 upward in the vertical direction. Then, the following balancing equation holds.

$$F = N\sin\theta + \mu N\cos\theta$$

$$T = N\cos\theta - \mu N\sin\theta$$

From the above two equations, when noting the operating force F, the following equation (1) holds:

$$F = \frac{\sin\theta + \mu\cos\theta}{\cos\theta - \mu\sin\theta}\cdot T \tag{1}$$

Here, a coefficient C is defined as the following equation (2):

$$\frac{\sin\theta + \mu\cos\theta}{\cos\theta - \mu\sin\theta} = C \tag{2}$$

By this, equation (1) can be expressed as F=C·T. The coefficient C and the contact angle θ have the relationship shown in the graph of FIG. 15. Here, FIG. 15 shows an example in which the coefficient of friction μ is 0.3 and 0.5. As can be seen from FIG. 15, the smaller the contact angle θ, the smaller the coefficient C is. Therefore, if the drag T for lifting the developer receiving portion 11 is constant, the smaller the contact angle θ, the smaller the operating force F becomes.

Here, because the developer receiving portion 11 is urged downward in the vertical direction by the urging member 12, the force T required to raise the developer receiving portion 11 becomes higher as the position of the developer receiving portion 11 in the vertical direction becomes higher. Therefore, if the contact angle of the engaging portion of the flange portion 3 which engages with the engaged portion 11*b* during the mounting operation of the developer supply container 1 is constant (in the case of Comparative Example 1), The higher the position of the developer receiving portion 11 in the vertical direction is, the higher the operating force F (broken line in FIG. 16).

On the contrary, in the case of this embodiment, like the curved portion 3*b* of the engaging portion 30, the shape of the surface engaged with the engaged portion 11*b* is curved so that the contact angle becomes sharper as the position is higher in the vertical direction. For this reason, as the position in the vertical direction is higher, the contact angle θ becomes smaller, and as shown in FIG. 15, the coefficient C also becomes smaller. Therefore, even when the position of the developer receiving portion 11 in the vertical direction is high, that is, the resistance is high, the coefficient C is small, and therefore, it is difficult for the operating force F to become high as will be understood from the expression (1). Therefore, the relationship between the position of the developer receiving portion 11 in the vertical direction and the operating force F becomes as shown by the solid line in FIG. 16, and the peak of the operating force F can be reduced as compared with the comparative example 1. From the above, in this embodiment, it is possible to reduce the operating force when mounting the developer supply container 1, thus improving the operability of the operator.

Here, in this embodiment, the curved portion 3*b* is provided at a position where engagement of the engaged portion 11*b* starts with the mounting operation of the developer supply container 1, but it is not always necessary to provide the curved portion 3*b* from this position. For example, the downstream end portion or intermediate portion of the engaging portion 30 in the mounting direction of the developer supply container 1 may be inclined in a direction (upward direction) in which the receiving opening 11*a* communicates with the container discharge opening 3*a*4 toward the upstream side in the mounting direction to be smoothly continuous with the curved portion 3*b* at the end portion.

Embodiment 2

Referring to parts (a) and (b) of FIG. 17 and FIG. 18, an Embodiment 2 will be described. In Embodiment 1 described above, the engaging portion 30 has a curved portion 3*b* and a parallel portion 3*c*. On the contrary, in this embodiment, the engaging portion 30A includes only a curved portion 3A. Other structures and operations are the same as in Embodiment 1 described above, and therefore, the illustration and explanation of the same structure will be omitted or simplified, and the following description mainly focuses on portions different from the structure of Embodiment 1.

As shown in part (a) of FIG. 17, the flange portion 3A has an engaging portion 30A which can engage with the engaged portion 11*b* (part (c) of FIG. 4) of the developer receiving portion 11. Similarly to Embodiment 1, in accordance with the mounting operation of the developer supply container 1, the engaging portion 30A displaces the developer receiving portion 11 toward the developer supply container 1 so that a connection state in which the developer can be replenished from the developer supply container 1 to the developer receiving portion 11 is established. In addition, the engaging portion 30A carries out the guide along with the removal operation of the developer supply container 1 so that the developer receiving portion 11 is displaced in a direction away from the developer supply container 1, by which the connection state between the developer supply container 1 and the developer receiving portion 11 is ceased.

In particular, in this embodiment, the engaging portion 30A has a curved portion 3Ab, and the curved portion 3Ab extends to a position where the developer receiving portion 11 is located at a position in which the receiving opening 11*a* (part (c) of FIG. 4) communicates with the container discharge opening 3*a*4 (part (b) in FIG. 5) by engagement with the engaged portion 11*b*. That is, in the case of this embodiment, as shown in part (b) of FIG. 17, the engaging portion 30A does not have the parallel portion 3*c* as in Embodiment 1 and the curved portion 3Ab is continuously formed from the downstream end 3Ab1 of the engaging portion 30A to the upstream end 3Ab2 in the mounting direction. That is, the upper surface of the engaging portion 30A has a curved shape extending from the downstream end 3*al* to the upstream end 3*a*2.

Here, as in Embodiment 1, the curved portion 3Ab is formed such that the angle (contact angle) formed between the mounting direction and the surface (curved surface) engaged with the engaged portion 11*b* becomes smaller toward the upstream of the mounting direction of the developer supply container 1 (the direction opposite to the arrow A direction). That is, a surface (upper surface) engaged with the engaged portion 11*b* of the curved portion 3*b* is curved so as to be convex up.

Also in the case of this embodiment, when the developer supply container 1 is mounted on the developer receiving apparatus 8, the engaged portion 11*b* of the developer receiving portion 11 comes into contact with the downstream end portion of the engaging portion 30A, in the mounting direction, of the curved portion 3*b*. And, along with the movement of the developer supply container 1 in the mounting direction (direction of arrow A), the engaged portion 11*b* is guided along the shape of the curved portion 3Ab. The developer receiving portion 11 displaces upward in the vertical direction, that is, in a direction approaching the developer supply container 1, by the engaged portion 11*b* being guided along the curved portion 3Ab in the mounting operation of the developer supply container 1. Also, when the developer supply container 1 is inserted, the engaged portion 11*b* is positioned in the neighborhood of the upstream end portion, in the mounting direction, of the curved portion 3Ab, and the receiving opening 11*a* is in a state of communicating with the container discharge opening 3*a*4.

Here, the developer supply container 1 is fixed at a predetermined mounting position in a state in which it is retracted in the mounting direction by a retracting device provided in the developer receiving apparatus 8. For this reason, the developer supply container 1 does not move in the removal direction unless an operator or the like intentionally takes it out by applying force. Therefore, even if the engaged portion 11*b* is positioned at the upstream end portion, in the mounting direction of the curved portion 3Ab, it does not inadvertently move to the downstream side along the curved portion 3Ab. Here, referring to FIGS. 18 and 20, the description will be made as to the behavior of the engaged portion 11*b* moving along the engaging portion of the flange portion during the mounting operation of the developer supply container 1. FIG. 20 is a schematic illustration of a locus of the position of the engaged portion 11*b* with respect to the engaging portion 30C during the mounting operation of the developer supply container 1 to the developer receiving apparatus 8 in the comparative example 2. FIG. 18 is a schematic illustration of the locus of the (the position of the engaged portion 11*b* with respect to the engaging portion 30A during the mounting operation of the developer supply container 1 to the developer receiving apparatus 8 in this embodiment.

As shown in FIG. 20, the engaging portion 30C of the comparative example 2 includes an inclined portion 30C1 inclined upward from the downstream end of the developer supplying container 1 in the mounting direction (direction of arrow A) toward the upstream side, and a parallel portion 30C2 continuing the upstream end portion of the inclined portion 30C1. In the case of Comparative Example 2, with the mounting operation of the developer supply container 1, the engaged portion 11*b* is guided along the inclined portion 30C1 to be displaced upward in the vertical direction. And, when the engaged portion 11*b* rides on the parallel portion 30C2 and moves, the receiving opening 11*a* becomes in a state of communicating with the container discharge opening 3*a*4.

In the case of Comparative Example 2, at the portion where the inclined portion 30C1 and the parallel portion 30C2 connect with each other, an inflection point 30C3 at which the inclination angle is switched is provided. Therefore, when mounting the developer supply container 1, the engaged portion 11*b* passes on the inflection point 30C3. For this reason, the direction of movement of the engaged portion 11*b* abruptly changes at the position passing on the inflection point 30C3, and this change may affect the operability at the time of mounting the developer supply container 1.

On the contrary, in this embodiment, as shown in FIG. 18, the engaging portion 30A has a curved portion 3Ab curved from the downstream end 3Ab1 to the upstream end 3Ab2. For this reason, there is no inflection point 30C3 as contrasted to Comparative Example 2, and when the developer supply container 1 is mounted, the engaged portion 11*b* moves smoothly along the curved portion 3A b. At this time, the moving direction of the engaged portion 11*b* changes smoothly, and therefore, the change in the moving direction has little influence on the operability at the time of mounting the developer supply container 1.

As described above, in the case of this embodiment, the curved portion 3Ab extends to the position where the developer receiving portion 11 is displaced to the position where the receiving opening 11*a* communicates with the container discharge opening 3*a*4 by engagement with the engaged portion 11*b*. For this reason, the operability at the time of mounting the developer supply container 1 can be improved.

Here, also in the case of this embodiment, as in Embodiment 1, the engaging portion 30A has the curved portion 3Ab formed such that in the angle formed between the surface engaging with the engaged portion 11*b* and the mounting direction becomes smaller toward the upstream in the mounting direction of the developer supply container 1. For this reason, it is possible to reduce the operating force when mounting the developer supply container 1.

Embodiment 3

Embodiment 3 will be described referring to part (a) of FIG. 19 through FIG. 20. In above-described Embodiment 2, regardless of the engagement with the engaged portion 11*b*, the engaging portion 30A has a curved shape. On the contrary, in the case of this embodiment, the engaging portion 30B deforms by engagement with the engaged portion 11*b* with the mounting operation of the developer supply container 1. Other structures and operations are similar to those of the first and Embodiment 2 described above, and therefore, the illustration and explanation of the same structure will be omitted or simplified, and the following description mainly focuses on portions different from the first and Embodiment 2.

As shown in part (a) of FIG. 19, the flange portion 3B has an engaging portion 30B which can engage with the engaged portion 11*b* (part (c) of FIG. 4) of the developer receiving portion 11. The base end portion 3Bb1 of the engaging portion 30B is fixed to the flange portion 3B and the other portion can be displaced relative to the flange portion 3B. And, as shown in part (b) of FIG. 19, the engaging portion 30B is provided in a state of standing in a direction intersecting the mounting direction (direction of arrow A) (vertical direction in the illustrated example) before engaging with the engaged portion 11*b*.

The engaging portion 30B is deformed by engagement with the engaged portion 11*b* with the mounting operation of the developer supply container 1. And, the structure is such that the engaging portion 30B has a curved shape such that the angle, relative to the mounting direction, of the locus of the engaged portion 11*b* in the mounting operation decreases toward the upstream in the mounting direction of the developer supply container 1 (the direction opposite to the arrow A direction).

In order to accomplish this, the engaging portion 30B is elastically deformable by engagement with the engaged portion 11*b* with the mounting operation of the developer supply container 1, and finally forms a curved portion 3Bb shown in FIG. 20. As in Embodiment 1, the curved portion 3Bb has a shape such that the angle relative to the mounting direction decreases as the surface (curved surface) engaged with the engaged portion 11*b* moves toward the upstream in the mounting direction of the developer supply container 1. The rigidity of each portion is set so that the engaging portion 30B finally has such a curved shape.

However, the final shape of the engaging portion 30B is not limited to this example. That is, it will suffice if by suitably setting the rigidity of each portion of the engaging portion 30B, the angle, with respect to the mounting direction, of the locus of the engaged portion 11*b* by the mounting operation becomes smaller toward the upstream in the mounting direction of the developer supply container 1.

The engaging portion 30B is elastically deformed so as to be bent about the base end portion 3Bb1 by engagement with the engaged portion 11*b*. In addition, in the case of this embodiment, as shown in parts (a) and (b) of FIG. 19, a positioning portion 31 is provided on the upstream side of the engaging portion 30B of the flange portion 3B in the mounting direction. The positioning portion 31 abuts against the free end portion 3Bb2 of the deformed engaging portion 30B to position the free end portion 3Bb2.

Referring to FIG. 20, the deformation of the engaging portion 30B will be described together with the mounting operation of the developer supplying container 1 to the developer receiving apparatus 8. When mounting of the developer supply container 1 is started, the engaged portion 11*b* approaches to the neighborhood of the base end portion 3Bb1 of the engaging portion 30B. At this time, the engaged portion 11*b* is not engaged with the engaging portion 30B, and therefore, the engaging portion 30B remains standing.

Next, when the developer supply container 1 is further inserted in the direction of the arrow A, the engaged portion 11*b* and the engaging portion 30B are engaged with each other, and the engaging portion 30B is bent in a direction in which the engaging portion 30B gradually bends, and simultaneously therewith, the engaged portion 11*b* is displaced upward by engagement with the engaging portion 30B. And, with the mounting operation of the developer supply container 1, the deformation of the engaging portion 30B and the upward displacement of the engaged portion 11*b* by the engagement with the engaging portion 30B continue. And, the free end portion 3Bb2 of the engaging portion 30B abuts on the positioning portion 31, whereby the engaging portion 30B becomes having a curved shape (curved portion 3Bb), and the engaged portion 11*b* is positioned in the neighborhood of the upstream end portion, in the mounting direction, of the curved portion 3Bb, so that the receiving opening 11*a* is in a state of communicating with the container discharge opening 3*a*4. In this embodiment, the engaging portion is formed such that the moving locus of the engaged portion 11*b* during such mounting operation becomes smaller toward the upstream in the mounting direction of the developer supplying container 1, so that the angle with respect to the mounting direction becomes smaller.

Here, in this embodiment, the curved portion 3Bb is constituted by the engaging portion 30B deformed into a curved shape as described above and the positioning portion 31 which is in contact with the free end portion 3Bb2 of the deformed engaging portion 30B. Therefore, the upper surface of the positioning portion 31 is curved so as to be smoothly continuous with the curved surface of the upper surface of the engaging portion 30B in a state where the free end portion 3Bb2 abuts.

As described above, in this embodiment, the engaged portion 11*b* is displaced such that the locus of the relative position with respect to the engaging portion 30B becomes a curved shape as described above during the mounting operation of the developer supply container 1. Therefore, also in the case of this embodiment, as in Embodiment 2, when the developer supply container 1 is mounted, the engaged portion 11*b* moves smoothly along the above-described curved shape. For this reason, the operability at the time of mounting the developer supply container 1 can be improved.

Here, the structure in which the engaging portion deforms by engagement with the engaged portion as in this embodiment may be applied to the structure of Embodiment 1. In this case, for example, the upper surface of the positioning portion may be the parallel portion of Embodiment 1.

Other Embodiments

In the above-described description, the discharge opening with which the receiving opening 11*a* of the developer receiving portion 11 communicates is the shutter opening 4*j* of the shutter 4. However, without employing a shutter, the receiving opening of the developer receiving portion may be directly contacted to the container discharge opening of the developer supply container 1 to establish communication with each other. In this case, the container discharge opening is the discharge opening for communicating with the receiving port.

INDUSTRIAL APPLICABILITY

According to the present invention, there is provided a developer supplying container and a developer supplying system capable of reducing the operating force for mounting the developer supplying container.

DESCRIPTION OF SYMBOLS

1=developer supply container: 2*c*=developer accommodating portion: 3, 3A, 3B=flange portion: 3*a*4=container discharge opening: 3*b*, 3Ab=curved portion: 3Bb1=base portion: 3Bb2=free end portion 3*c*=parallel portion: 4=shutter: 4*j*=shutter opening (discharge opening): 8=developer receiving device: 11=a developer receiving portion: 11*a*=receiving opening: 11*b*=engaged portion: 12=urging member (urging means): 30, 30A, 30B=engaging portion: 31=positioning portion: 200=developer supply system: 300=discharging portion

The invention claimed is:

1. A developer supply container comprising:

a developer accommodating body configured to accommodate developer, the developer accommodating body being provided with a gear portion;

a developer discharging body in fluid communication with the developer accommodating body, the developer discharging body having a discharge opening, with the discharge opening being configured to form at least a part of a discharge passageway through which developer may be discharged to outside of the developer supply container, with an end of the discharge passageway being positioned at a bottommost side of the developer supply container, and with the developer accommodating body being rotatable about a rotational axis thereof relative to the developer discharging body;

a track including a fixed portion fixed on the developer discharging body and an elastically deformable portion extending from the fixed portion to a free end portion that is displaceable from the developer discharging body such that the elastically deformable portion intersects a horizontal plane that is parallel to the rotational axis; and a shutter movable relative to the developer discharging body between an open position wherein the discharge opening is open and a closed position wherein the discharge opening is closed by the shutter, wherein the developer discharging body is provided with a shutter support movably supporting the shutter, and wherein, as viewed in a direction towards the bottommost side of the developer supply container, the shutter support extends at least from the discharge opening toward the developer accommodating body but does not overlap the gear.

2. A developer supply container according to claim 1, further comprising a projection projected from each of opposite sides of the developer discharging body, each projection having a portion that is in a movable range of the elastically deformable portion of the track on the same side of the developer discharging body.

3. A developer supply container comprising:

a developer accommodating body configured to accommodate developer, the developer accommodating body being provided with a gear portion;

a developer discharging body in fluid communication with the developer accommodating body, the developer discharging body having a discharge opening, with the discharge opening being configured to form at least a part of a discharge passageway through which developer may be discharged to outside of the developer supply container, with an end of the discharge passageway being positioned at a bottommost side of the developer supply container, and with the developer accommodating body being rotatable about a rotational axis thereof relative to the developer discharging body; and a track provided at each of opposite sides of the developer discharging body, each track including a fixed portion fixed on the developer discharging body and an elastically deformable portion extending from the fixed portion to a free end portion that is displaceable from the developer discharging body such that the elastically deformable portion intersects a horizontal plane that is parallel to the rotational axis;

a shutter movable relative to the developer discharging body between an open position wherein the discharge opening is open and a closed position wherein the discharge opening is closed by the shutter;

wherein the developer discharging body is provided with a shutter support movably supporting the shutter, and wherein, as viewed in a direction towards the bottommost side of the developer supply container, the shutter support extends at least from the discharge opening toward the developer accommodating body but does not overlap the gear.

4. A developer supply container according to claim 3, further comprising a projection projected from each of the opposite sides of the developer discharging body, each projection having a portion that is in a movable range of the elastically deformable portion of the track on the same side of the developer discharging body.

* * * * *